United States Patent [19]

Brooks, Jr. et al.

[11] Patent Number: 4,575,814
[45] Date of Patent: Mar. 11, 1986

[54] PROGRAMMABLE INTERFACE MEMORY

[75] Inventors: Charles W. Brooks, Jr., Annapolis; William L. Price, Severna Park, both of Md.

[73] Assignee: Westinghouse Electric Corp., Pittsburgh, Pa.

[21] Appl. No.: 382,318

[22] Filed: May 26, 1982

[51] Int. Cl.$^4$ .......................................... G06F 13/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,812,470 | 5/1974 | Murtha et al. | 364/200 |
| 3,955,180 | 5/1976 | Hirtle | 364/200 |
| 4,056,845 | 11/1977 | Churchill, Jr. | 364/200 |
| 4,150,364 | 4/1979 | Baltzer | 364/900 X |
| 4,166,289 | 8/1979 | Murtha et al. | 364/200 |
| 4,403,288 | 9/1983 | Christian et al. | 364/200 |
| 4,439,827 | 3/1984 | Wilkes | 364/200 |

Primary Examiner—Thomas M. Heckler
Attorney, Agent, or Firm—W. E. Zitelli

[57] ABSTRACT

A digital signal processing system and more especially a programmable bulk memory included therein comprising a plurality of memory sections independently controlled and simultaneously operative for transferring blocks or vectors of digital data words directly between selected memory sections and external data handling units while maintaining the corresponding variety of data handling throughput rates thereof without the need for input-output buffer type memories coupled therebetween is disclosed. A method of addressing the sections of addressable memory locations for accessing therefrom and storing therein blocks of data words in accordance with predetermined sequences is also disclosed.

34 Claims, 24 Drawing Figures

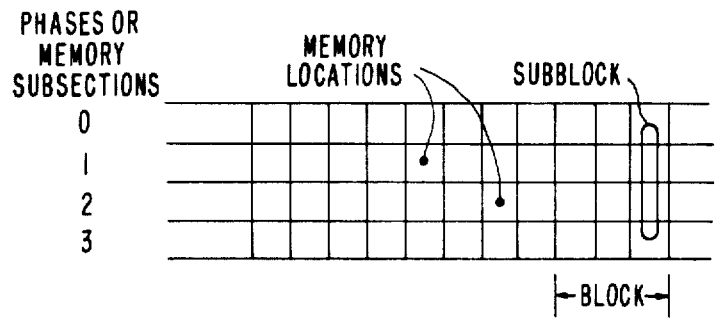

| BLOCK | 0 | | | 1 | | | 2 | | | 3 | | | 4 | | | PHASE |
|---|---|---|---|---|---|---|---|---|---|---|---|---|---|---|---|---|
| SUBBLOCK | 0 | 1 | 2 | 0 | 1 | 2 | 0 | 1 | 2 | 0 | 1 | 2 | 0 | 1 | 2 | |
| | 0 | 4 | 8 | 3 | 7 | | 2 | 6 | | 1 | 5 | | 0 | 4 | | 0 |
| | 1 | 5 | | 0 | 4 | 8 | 3 | 7 | | 2 | 6 | | 1 | | | 1 |
| | 2 | 6 | | 1 | 5 | | 0 | 4 | 8 | 3 | 7 | | 2 | | | 2 |
| | 3 | 7 | | 2 | 6 | | 1 | 5 | | 0 | 4 | 8 | 3 | | | 3 |

FIG.4D

| BLOCK | 0 | | | 1 | | | 2 | | | 3 | | | 4 | | | PHASE |
|---|---|---|---|---|---|---|---|---|---|---|---|---|---|---|---|---|
| SUBBLOCK | 0 | 1 | 2 | 0 | 1 | 2 | 0 | 1 | 2 | 0 | 1 | 2 | 0 | 1 | 2 | |
| | 0 | 4 | 8 | 1 | 5 | 9 | 2 | 6 | | *3 | | 7 | 0 | 4 | | 0 |
| | 1 | 5 | 9 | 2 | 6 | | *3 | | 7 | 0 | 4 | 8 | 1 | | | 1 |
| | 2 | 6 | | *3 | | 7 | 0 | 4 | 8 | 1 | 5 | 9 | 2 | | | 2 |
| | *3 | | 7 | 0 | 4 | 8 | 1 | 5 | 9 | 2 | 6 | | *3 | | | 3 |

FIG.4E

| BLOCK | 0 | | | 1 | | | 2 | | | 3 | | | 4 | | | PHASE |
|---|---|---|---|---|---|---|---|---|---|---|---|---|---|---|---|---|
| SUBBLOCK | 0 | 1 | 2 | 0 | 1 | 2 | 0 | 1 | 2 | 0 | 1 | 2 | 0 | 1 | 2 | |
| | 0 | 4 | 8 | 1 | 5 | 9 | 2 | 6 | 10 | 3 | 7 | | 0 | | | 0 |
| | 1 | 5 | 9 | 2 | 6 | 10 | 3 | 7 | | 0 | 4 | 8 | 1 | | | 1 |
| | 2 | 6 | 10 | 3 | 7 | | 0 | 4 | 8 | 1 | 5 | 9 | | | | 2 |
| | 3 | 7 | | 0 | 4 | 8 | 1 | 5 | 9 | 2 | 6 | 10 | | | | 3 |

PROGRAMMABLE INTERFACE MEMORY

CROSS-REFERENCE TO RELATED COPENDING APPLICATION

The copending application Ser. No. 146,934, filed May 5, 1980 by John C. Murtha, J. Ross, C. Adams, and K. Lucas, now U.S. Pat. No. 4,447,873, which is a continuation of the application Ser. No. 832,853 filed Sept. 13, 1977, now abandoned, both being assigned to the same assignee as the present application, is referenced in the present application as background subject matter.

BACKGROUND OF THE INVENTION

The present invention relates to digital signal processing systems, in general, and more particularly to a digital signal processing system including a programmable bulk memory comprising a plurality of memory sections independently controlled and simultaneously operative for transferring blocks or vectors of digital data words directly between selected memory sections and external data handling units while maintaining the corresponding variety of data handling throughput rates thereof without the need for input-output buffer type memories coupled therebetween.

Generally, a digital signal processing system includes a bulk memory for storage of large data files for use by at least one signal processing unit interfaced therewith. Usually, data is obtained from one or more input data sources in the form of blocks or vectors of digital data words. Because of the throughput rate differences between the data input sources and the bulk memory, certain buffer memory units, such as first-in-first-out memories, for example, may be coupled therebetween to collect and transfer the blocks of data to the bulk memory. Other input-output buffer memories may be coupled between the digital signal processors and the bulk memory to compensate for the exchange rate differences also existing therebetween.

In addition, the bulk memory may also distribute the processed data stored therein to various destination units also utilizing output buffer memories to accommodate the differences of throughput rates in the transfer of data words. Typically, a storage controller is included as part of the bulk memory for independently accessing or storing the blocks of data words under control of a programmed set of instructions. For a more detailed description of exemplary digital signal processing systems of this type, reference is hereby made to the U.S. Pat. Nos. 4,166,289 issued to John C. Murtha et al. on Aug. 28, 1979 and 3,812,470 issued to John C. Murtha et al. on May 21, 1974; and to the aforementioned referenced copending continuation application bearing Ser. No. 146,934 filed May 5, 1980 by John C. Murtha et al., all being assigned to the same assignee as the present application.

In view of that described hereabove, it appears that the digital signal processing systems of the type referred to above are adequate in their performance of certain specified operations. However, this does not mean that they may not be improved in order to enhance the effectiveness of their data transfer and processing operations. For example, while the input-output buffer memories appear to adequately provide a transfer mechanism which compensates for the varying throughput rates between the bulk memory and the data handling units interfacing therewith, they also provide additional hardware for the temporary buffer storage of the blocks of data words being transferred and for the control logic required for the data word transfer operations associated therewith. A more detailed description of input-output buffer memories of this type, especially for the case where independent operation is desired, is outlined in the aforementioned copending continuation application Ser. No. 146,934.

Another avenue of improvement may be connected with the storage and accessing operations of the data files in the bulk memory of a digital signal processing system. Present digital signal processing systems, such as the one described in the aforementioned U.S. Pat. Nos. 4,166,289 and 3,812,470, for example, provide for the transfer of only one block of data words at a time between the bulk memory and the various data handling units interfaced therewith. In other words, concurrent operations of collecting and supplying digital data words to and from the bulk memory, respectively, does not appear to be facilitated by the processing system architecture thereof. What is provided, however, is a complex priority and interrupt structure to allow for the transfers of more important information over that of lesser importance. This of course increases the complexities of the bulk memory storage controller.

In still another area, it is understood that in some signal processing systems the blocks of digital data words are processed in a non-sequential manner. In these instances, the blocks of data words are stored and accessed to expedite the throughput rate in connection with this non-sequential processing requirement. For example, in some radar systems which detect moving targets, digitized video echo signals in the form of blocks or vectors of data words are transferred to and stored in the bulk memory in accordance with a broad spectrum of ranges or range cells. However, in the processing of these vectors, a vector arithmetic processor, for example, many process the information of one range cell over a period of time. Thus, the stored data words must be sequentially accessed to accommodate the processing operations in order to detect target motion in a given range cell. In the radar art, this sequencing is more commonly referred to as corner turn sequencing.

To further complicate matters, the bulk memory because of the requirements of higher density memory parts generally has a slower data transfer rate than that of the signal processor. For this reason, time multiplexing of prespecified memory cells is, at times, utilized to compensate for the differences in transfer rates. In the instances where both time multiplexing and corner turn sequencing are both desired, the data vectors should be stored and accessed to facilitate compliance with the time multiplexing operations in order to permit expeditious data transfer between the bulk memory and the external data handling units, especially that of a high speed signal processor.

While only a few of the improvement aspects of a digital signal processing system especially in the area of the bulk memory and storage controller have been described hereabove, they are sufficient to demonstrate the improvement potential in such systems. Furthermore, while the inventive aspects described herebelow in a preferred embodiment form are directed primarily to the bulk memory and the control logic associated therewith, it is understood that improvements in these areas will additionally improve the effectiveness of an overall digital signal processing system. Accordingly, the overall improvements to the digital processing system resulting from the inventive aspects will become more fully understood and appreciated from the description of the preferred embodiment found herebelow.

SUMMARY OF THE INVENTION

One aspect of the present invention is directed to a programmable digital memory operative in response to programmed instructions to transfer digital data words between itself and at least one data handling unit external thereto. The digital memory comprises the elements of a bulk memory partitioned into a plurality of memory sections, a plurality of memory address generators coupled correspondingly to the plurality of memory sections, and memory control logic circuitry operative in response to programmed instructions to distribute each programmed instruction to a correspondingly designated memory address generator. Each memory address generator is operative simultaneously with and independently of the other address memory generators of the plurality to control the address sequencing for the transfer of digital data words between the memory section coupled thereto and a selected data handling unit, and to generate signals representative of the states of operation thereof. Accordingly, the memory control logic circuitry distributes programmed instructions to correspondingly designated memory address generators in accordance with the signals representative of the operational states thereof for governing the memory address sequencing operations performed thereby.

More specifically, each partitioned memory section comprises a plurality of memory subsections having commonly addressable memory locations for time-multiplexing data word transfer operations. Each memory address generator includes memory address sequencing apparatus for storing selected blocks of digital data words in corresponding blocks of memory locations, comprising a set of commonly addressable memory locations of the memory subsections, in accordance with desired time-multiplexed memory address accessing sequences correspondingly predetermined therefor.

In another aspect of the present invention, a digital signal processing system comprises at least one signal processor, at least one source of digital data words for processing by the signal processor, at least one destination unit for accepting processed digital words, and a bulk digital memory operative in response to programmed instructions to transfer digital data words between itself and the source of digital data words, the destination unit and the signal processor. The signal processor has an input section for accepting digital words for processing and an output section for transferring processed digital words therefrom. The bulk digital memory comprises a plurality of memory sections, a plurality of memory address generators coupled correspondingly thereto and a memory control logic circuit operative in response to the programmed instructions to distribute each programmed instruction to a corresponding designated memory address generator. Each memory address generator is operative simultaneously with and independent of the other memory address generators of the plurality to control the address sequencing for the transfer of digital data words between the memory section coupled thereto and a selected one of the source of digital data words, the destination unit, and the signal processor and to generate signals representative of the states of operation thereof. The programmed instructions are distributed to correspondingly designated memory address generators by the memory control logic circuitry in accordance with the signals representative of the states of operation of said memory address generators for governing the memory address sequencing operations performed thereby.

A further aspect of the invention is directed to a method of addressing a section of addressable memory locations for accessing therefrom and storing therein blocks of data words in accordance with predetermined sequences. The memory section is divided into subblocks, each having a predetermined number of memory locations m. The steps of the method include: deriving a value $x_i$ associated with a corresponding block of data words i, based on the number of data words of the block i, a predetermined number of memory locations m in a subblock, and the minimum number of subblocks $n_i$ capable of storing the data words of the block i; addressing the memory locations of the memory section for a plurality of blocks of data words in accordance with a straight sequence by sequencing all of the addressable memory locations of one subblock from a predetermined initial memory location prior to advancing to addressably sequence another subblock of said memory section, and skipping over memory location addresses during the memory section address sequencing between successive blocks of data words in accordance with the derived values, $x_i$; and addressing the memory locations of the memory section for a plurality of blocks of data words in accordance with a corner turn sequence by sequencing traversely the memory location addresses of the subblocks in one of either a straight or reverse sequential order based on the derived value $x_i$ associated with the blocks of data words, and skipping over memory location addresses during the memory section address sequencing between successive blocks of data words based on the modulo m value of the number of blocks in the plurality and the $x_i$ value of the data word blocks thereof.

BRIEF DESCRIPTION OF THE DRAWINGS

FIGS. 4A–4F are graphs which are representative of an exemplary partitioned memory section array suitable for illustrating the various memory addressing sequences thereof in connection with another aspect of the present invention.

FIGS. 6A and 6B depict typical programmed instruction word formats suitable for operating the programmable memory embodiment depicted in FIG. 1.

DESCRIPTION OF THE PREFERRED EMBODIMENT

Figure 1:
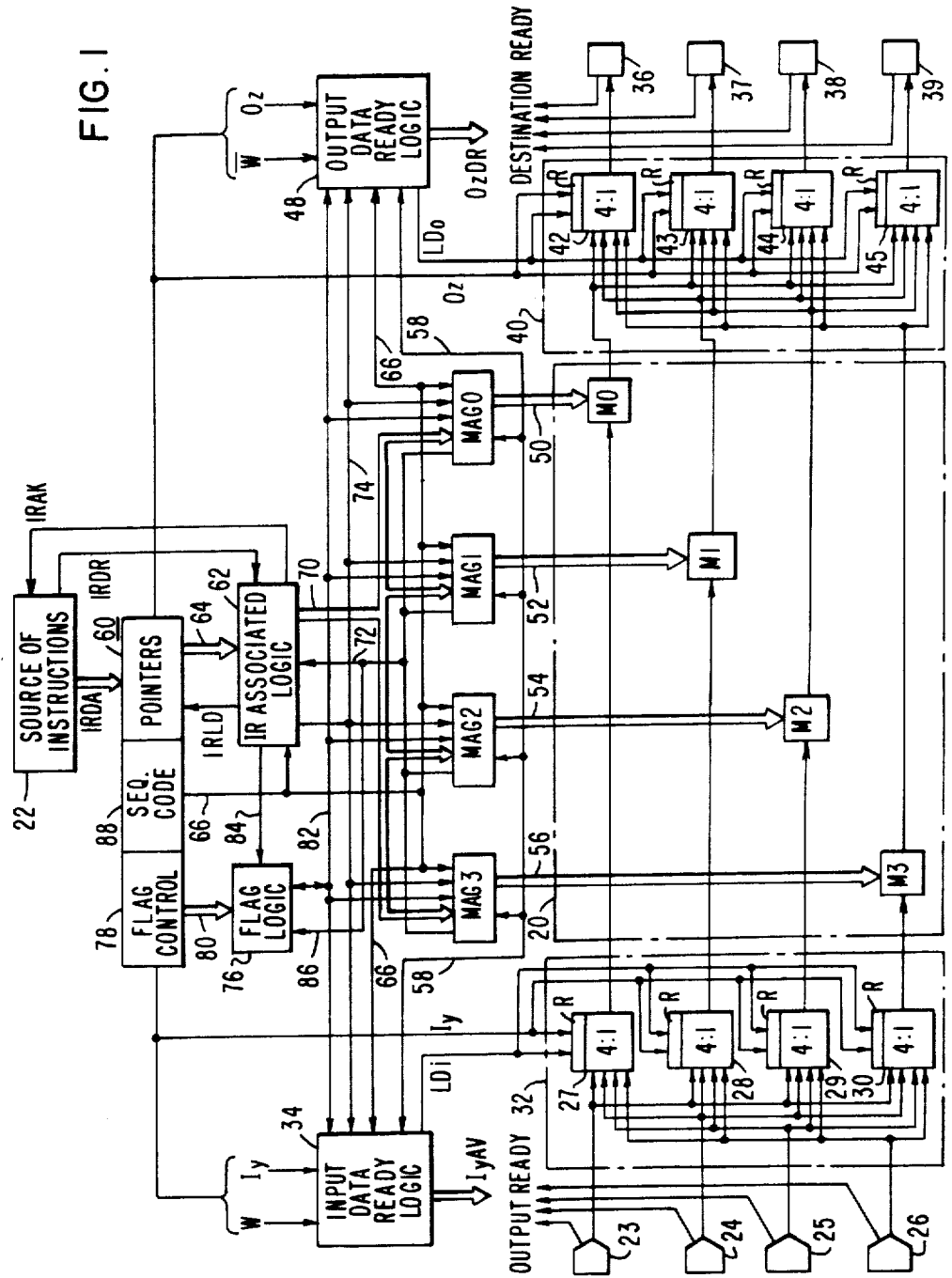
FIG. 1 is a block diagram schematic of a programmable memory interfaceable with a plurality of peripheral data handling units and governed by a set of programmed instructions, the memory system being suitable for embodying one aspect of the present invention.

FIG. 1 depicts a block diagram schematic of an embodiment of a programmable memory interfaceable with a plurality of source and destination data handling units and governed by a set of instructions provided from a predetermined source 22. In the embodiment shown in FIG. 1, a bulk memory portion 20 may be divided into four memory sections M0, M1, M2 and M3. This partitioning into four memory sections is merely for the convenience of describing the various aspects of the present invention. It is understood that the bulk memory 20 may be divided into a lesser or a greater number of sections without deviating from any of the broad principles of the present invention. In addition, the source of programmed instructions 22, which direct the input/output data transfers of the programmable memory, may be included as part of the programmable memory itself, or as part of one of the data handling units such as a signal processor, for example. Moreover, in describing the embodiment depicted in FIG. 1, certain timing signals, like the system clock and other clock signals used primarily for synchronizing operations are omitted because they are considered well known to anyone skilled in the pertinent art.

A plurality of source data handling units depicted by the blocks 23, 24, 25 and 26, for example, are provided to illustrate an independent and simultaneous transmission of digital data words from an arbitrary number of sources to the various partition subsections of the bulk memory 20. An input source select logic or switching circuit 32 may be coupled between the data handling units 23 through 26 and the bulk memory 20 and may include logic circuitry arranged to provide each memory section M0–M3 with digital data from any of the source data handling units. More specifically, in the present embodiment, a plurality of 4-to-1 digital word multiplexers 27–30 are included in the logic circuit 32 and have their outputs coupled to the partitioned memory sections M0–M3, respectively. The outputs of each of the data handling units 23–26 are, as a group, provided to each of the inputs of the digital data word multiplexers 27–30 of the logic circuit 32. In addition, each of the data word multiplexers 27–30 include a storage register R for holding a source select code Iy which governs the selection of which source data handling unit is to be coupled to the corresponding partitioned memory section.

Also included in the programmable memory embodiment may be an Input Data Ready Logic circuit 34 which generates input available signals IyAV associated with each input source y and memory section x combination selected. Also generated from the data ready logic 34 is a signal LDi which loads the register R of a designated data multiplexer unit in the logic circuit 32 with the source select code Iy. For handshaking purposes, each source data handling unit 23–26 may output an Output Ready signal when it is ready to transfer its block of digital data words. In the present embodiment, when coincidence occurs between selected corresponding Output Ready and IyAV signals, the transfer of data words between the designated data handling unit y and associated partitioned memory section x may be permitted.

Additionally included in the block diagram schematic embodiment of FIG. 1 may be a plurality of destination data handling units designated by the blocks 36–39 which may be utilized for receiving stored data words from the partitioned memory sections M1–M3 of the bulk memory 20. Coupled between the bulk memory 20 and the destination data handling units 36–39 may be an output memory select logic or switching circuit 40 which may include, for the purposes of the present embodiment, a plurality of 4-to-1 data word multiplexers 42–45. The output of each data word multiplexer of the logic circuit 40 may be coupled to a corresponding destination data handling unit and the inputs thereof may be each coupled to the group of outputs of the four partitioned memory sections M0–M3. Likewise, each data word multiplexer 42–45 may include a storage register R for holding an output memory select code Oz supplied thereto. The memory select code Oz held in the register R of an individual data word multiplexer unit designates which memory section M0–M3 is to be coupled to to the destination data handling unit associated therewith.

An Output Data Ready logic circuit 48 includes logic circuitry for generating output data ready signals OzDR indicative of which memory sections are ready to have data words transferred therefrom. The logic circuit 48 additionally provides loading signals LDo for the registers R of the data word multiplexer units of the circuit 40 for loading therein the memory select codes Oz at the appropriate times. For handshaking purposes, each destination data handling unit 36–39 may output a Destination Ready signal when it is ready to receive its block of digital data words. In the present embodiment, when coincidence occurs between selected Destination Ready and OzDR signals, the transfer of data words between the designated partitioned memory section x at the corresponding destination data handling unit z may be permitted.

A plurality of memory address generators MAG-0–MAG3 may be coupled respectively to the plurality of partitioned memory sections M0–M3. Each MAG is operative to generate both the addresses and timing signals to sequence its corresponding memory section during the data word transfer operations thereof. The address and timing signals for the memories M0-M3 are provided over the signal lines 50, 52, 54 and 56, respectively. In addition, each of the memory address generators also communicate with the input and output data ready logic circuits 34 and 48, respectively, utilizing the signal lines denoted by 58.

Further included in the programmable memory may be a next instruction register 60 which holds the next instruction prior to being distributed to the various other operating functional units of the programmable memory for execution therein. To coordinate the activities of updating the next instruction register 60 with new instruction data and for distributing the instruction information to the various operating units, an instruction register (IR) associated logic circuit 62 may be included. At least two handshaking signals IRDR and IRAK may be provided between the source of instructions 22 and associated logic circuit 62 to establish the conditions under which the next instruction may be transferred to the next instruction register 60. The signal IRLD provided by the logic circuit 62 enables the instruction register 60 to be updated with the next instruction, denoted as IRDA, from the source of instructions 22. Portions of the instructions are provided to the logic circuit 62 utilizing signal lines 64 and 66. Another portion of the instruction word in the register 60, namely the source select code Iy, is provided to the input data logic circuit 34 and the data word multiplexers 27-30 of the circuit 32. A signal indicative of a write operation, denoted as W, is also provided from the instruction register 60 to the data ready logic 34. Similarly, the output memory select code Oz is provided from the instruction register 60 to the output data ready logic circuit 48 and to the data word multiplexers 42-45 in the output memory select circuit 40. Also a signal indicative of a read operation, denoted as $\overline{W}$, is provided from the instruction register 60 to the data ready logic circuit 48.

After operating on the instruction data over signal line 64, the associated logic circuit 62 distributes new instruction data to a designated memory address generator utilizing the bus lines 70. Certain conditional logic signals representative of the state of operation of the memory address generators may be provided to the associated logic circuit 62 over signal lines 72. In response, the associated logic circuit 62 may distribute the signals representative of the state of operation of the memory address generators to the input and output data ready logic circuits 34 and 48, respectively, and back to the memory address generators themselves primarily for handshaking purposes utilizing the signal lines 74.

Also included in the programmable memory may be a flag logic circuit 76 which comprises bit memory circuits for setting flags which may act as permissives to control the execution of an instruction in one or more of the aforementioned operational circuits. The flags of the flag logic circuit 76 may be set and reset in accordance with the flag control section 78 of the instruction data which is provided thereto over signal lines 80. Signals representative of the states of the flags may be provided to the various operational units of the programmable memory utilizing the signal lines 82. Signals representing the states of operation of the memory address generators may also be provided to the flag logic circuit 82 utilizing the signal lines 84 and 86.

In a typical operation of the programmable memory embodiment, the source of instructions 22 may generate the signal IRDR which is indicative of there being an instruction ready for transfer to the register 60. The associated logic 62 determines from the conditional logic signals presented thereto from the other operational units if the instruction register 60 may be updated. If the desired conditions are met, the acknowledge signal IRAK is presented to the instruction source 22 and concurrently, the load signal IRLD is applied to the instruction register 60. The instruction data word IRDA is then loaded into the instruction register 60 from the source of instructions 22. The sequence code portion 88 of the instruction word is provided to the memory address generators over signal lines 66 as well as the associated logic circuit 62. Included in this code 88 is the address of the memory address generator to which the instruction word is to be distributed from the associated logic circuit 62.

If the instruction in register 60 commands a write operation, the appropriate signals W and Iy are provided to the input data ready logic circuit 34 and the holding registers of the input select circuit 32. Conversely, if a read operation is desired, then the appropriate signals $\overline{W}$ and Oz are provided to the output data ready logic circuit 48 and the holding registers of the memory select circuit 40. If it is determined from the signal states over lines 72 that the designated memory address generator is not presently busy performing a data word transfer on its corresponding memory section, the associated logic circuit 62 allows the instruction data to be distributed to the designated memory address generator utilizing signal lines 64 and 70. Digital loading signals to load the instruction information into the operational blocks 34 or 48 and the designated MAG are provided over signal lines 74. Correspondingly, the input or output data ready logic circuit 34 or 48, respectively, provides the proper loading signal LDi or LDo to the designated data word multiplexer to load in the register R thereof either the input or output select codes Iy or Oz, as the case may be. Under this condition, either a source or destination data handling unit is coupled to a memory section for transfer of data words therebetween.

If data is to be written into a designated memory section, the input data ready logic circuit 34 determines the state of operation of the designated memory address generator utilizing the information over signal lines 74 and 58 and determine which flags are set utilizing the signals over data lines 82 in order to generate the corresponding input available signal IyAV. When coincidence occurs between the Output Ready and input available signals designated by the instruction data, the selected memory address generator may begin its address sequence governing the writing of data words into its corresponding memory section from the designated source data handling unit.

Likewise, for a data read operation, the output data ready logic circuit 48 is operative to determine the states of operation of the various address generators utilizing signal lines 74 and the states of the flags utilizing signal lines 82. From this monitored data, the logic circuit 48 may generate an output data ready signal OzDR corresponding to the designated memory section from which data is to be transferred. When coincidence exists between the output data ready signal and the Destination Ready signal of the corresponding destination data handling unit, the selected memory address generator may govern its corresponding memory section to transfer data words in accordance with a predetermined sequence to the destination data handling unit coupled thereto.

The foregoing brief description was provided to give the reader an overview of the general architecture of the programmable memory as well as the operational capabilities thereof. It is understood that many of the details and intricacies of the types of signals and signal timing were omitted to facilitate a brief description. However, the intricacies of the operational blocks and the various logic and timing signals flowing therebetween will be described in greater detail in the following paragraphs.

Since the programmable memory, one embodiment of which being depicted in FIG. 1, is intended to store large volumes of data, it is desirable to be able to use larger density memory elements. The speed performance of these higher density memory elements is usually significantly slower than the desired throughput rate of many of the data handling units interfaced therewith. In order to achieve a higher throughput rate with the use of higher density memory elements, each memory section Mi of the programmable memory embodiment may be subdivided into a plurality of memory subsections for time multiplexing operations. An arrangement of memory subsections suitable for use as time multiplexed elements in the embodiment depicted in FIG. 1 is illustrated in the block diagram schematic of FIG. 2. In addition, FIG. 3 illustrates a timing relationship for this particular structural arrangement.

To incude most of the possibilities, it is assumed that each data word stored in the memory sections may include both a real and an imaginary part. The circuit arrangement depicted in FIG. 2 includes a time multiplexed memory portion for both the real data and imaginary data of an input data word. Accordingly, the real and imaginary subsections of the memory sections may be similar in structural arrangement and operate in parallel. It is understood that if the data signal processing system requires only real data or imaginary data, the one or the other which is not needed may be simply deleted.

For the present embodiment, the real and imaginary portions of the memory section may each comprise a four input data holding register 100R and 100I, four memory subsections MSR1 through MSR4 and MSI1 through MSI4, a 4 to 1 memory output data word multiplexer 102R and 102I, and a memory word output register 104R and 104I. Also included may be four address holding registers 106 which are coupled to the address inputs of respective memory subsections. In some cases, the memory subsections are assumed to be $T^2L$ compatible MOS logic devices while generally all inputs and outputs of the memory section may be ECL logic compatible. For this reason then an ECL to $T^2L$ logic level translator may be provided at each input as shown at 108, 110 and 112 and in addition a $T^2L$ to ECL logic level translator may be supplied at each output as shown at 114 and 116.

Figure 3:
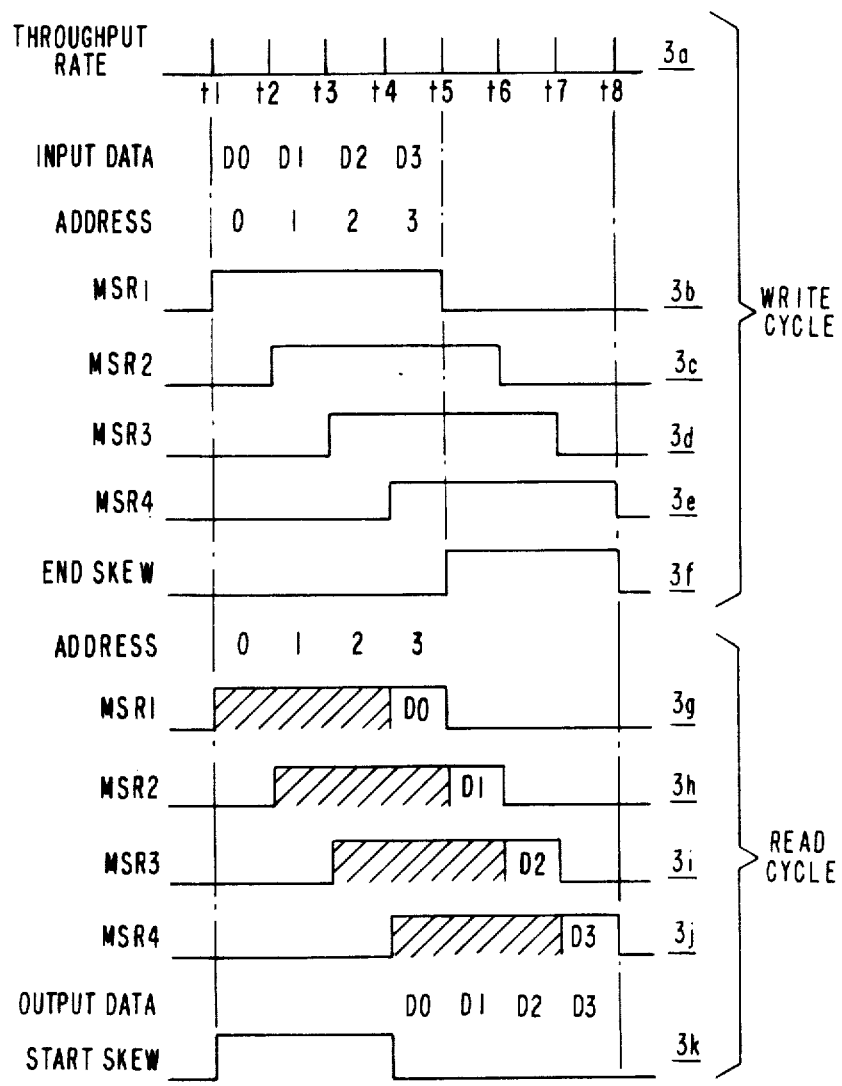
FIG. 3 consists of time waveforms 3a-3k which illustrate the timing relationship for the operation of a bulk memory of the type similar to that depicted by the embodiment of FIG. 2.

The waveforms illustrated in FIG. 3 exemplify read and write cycle operations for a 4 to 1 time multiplexed memory subsection operation. That is, each of the four memory subsections MSR1 through MSR4 and/or MSI1 through MSI4 operate at one-fourth the throughput rate. In this manner, the throughput rate is preserved by addressing the memory subsections in sequential order. Hence, each memory subsection can receive a new address every four throughput cycles and the memory subsections may be operated in a time multiplex manner in order to allow the memory section to receive a new address every system clock time.

Referring to FIG. 3, waveform 3a illustrates the timing of a system clock for a typical digital signal processing system. The waveforms 3b through 3f illustrate a 4 to 1 write cycle time multiplex operation and conversely, the waveforms 3g through 3k illustrate a read cycle time multiplex operation as applied to the specific embodiment depicted in FIG. 2. For example, for a write cycle, the memory subsections MSR1 through MSR4 may be addressed sequentially at the system clock cycles t1 through t5, respectively, utilizing the address registers in the block 106 and data and registers 100R and 100I. In the present example, it is assumed that it may take as long as four system clock cycles to completely store a digital data word in a memory subsection (refer to waveforms 3b through 3e). As a result, at the end of a write cycle, three additional system clock cycles t6 through t8 may be required to complete the write operation of the last memory subsection MSR4, for example. This boundary condition for a write cycle may be referred to as an "end skew" as shown in the waveform 3f of FIG. 3.

While these three system clock cycles or "end skew" time period appears significant for writing only one digital data word in each of the memory subsections sequentially, it will become less significant as the number of digital data words collected and stored in the memory subsection increase. For example, in a more typical case, as many as one thousand digital data words may be stored as a block or vector of digital data words in the various memory subsections. In this case, it is clear that the three system clock cycles of the end skew period become insignificant overall. Consequently, at time t8 all of the digital data words D0, D1, D2, and D3, for example, may be stored in their respective memory subsections for access at a later time.

A similar sequence of events may occur during a read cycle by sequentially addressing the various memory subsections as illustrated in the waveforms 3g through 3j of FIG. 3. For a read cycle, the address registers 106 and the data word multiplexers 102R and 102I may be concurrently operated for the time multiplex data accessing operations. The output registers 104R and 104I may be additionally utilized for temporary buffer storage on an individual readout data word basis. Assuming for the present example, that it requires three system clock cycles, say t1 through t3, for example, to represent the time between when the memory subsection is addressed and data is available at the output thereof, i.e. the time when readout should be prohibited. These three system clock cycles at the beginning of a read cycle may be referred to as the "start skew" period and are illustrated in the waveform 3k in FIG. 3. Again, in the process of reading out a block of one thousand digital data words, for example, the "start skew" time period becomes less significant to the overall read cycle time. For the most part, during the start and end skew time periods, the memory subsections may not be dependent on any external conditions. This condition permits the start and end skew times to be transparent to the external source and destination data handling units under most operating conditions.

While the time multiplexing of the memory subsections of each memory section increases the throughput rate thereof, it at the same time affects the address sequencing with regard to storing and accessing large blocks of digital data words especially in the case where non-sequential processing sequences are desired. For example, if a memory section is required to store two or more digital data words in the same memory subsection at consecutive time intervals, the throughput rate will be decreased as a result. This same problem also occurs in the accessing of digital data words consecutively from a common memory subsection. Therefore, to maintain the throughput rate of the memory section, the address sequences for storing blocks of digital data words should not only be compatible with the time multiplexed memory subsections but should also be compatible with the sequential or non-sequential order selected for accessing the digital data words of the block. The development of a variety of these memory address sequences in connection with the operation of the memory address generator will be described in greater detail herebelow.

As described above, the development of the memory address sequence is affected by the desire to use time multiplexed memory subsections which enhance the throughput rate of the partitioned memory sections. For the purposes of the present discussion, a 4 to 1 time multiplex memory subsection block will be used as an example. However, it is clearly understood that the memory address sequence concept may be applicable to other multiplex ratios as well. For the purpose of this description, a data set sequence may comprise a set of data vectors, denoted as DVi. Generally, there may be many types of data sets, but only two will be considered as examples in this discussion, one being a straight sequence data set and the other a corner turn sequence data set. For example, a straight data set sequence DVi may be represented by the family of equations as shown below:

$$\left. \begin{array}{l} DV_0 = N^0, \ldots, 2^0, 1^0, 0^0 \\ DV_1 = N^1, \ldots, 2^1, 1^1, 0^1 \\ \cdot \quad \cdot \\ \cdot \quad \cdot \\ DV_n = N^n, \ldots, 2^n, 1^n, 0^n \end{array} \right\} \quad (1)$$

And, the non-sequential or corner turn (CT) data set sequence $DV_j$ may be represented by the following family of equations:

$$\left. \begin{array}{l} DV_0 = 0^0, 0^1, \ldots, 0^n \\ DV_1 = 1^0, 1^1, \ldots, 1^n \\ \cdot \quad \cdot \\ \cdot \quad \cdot \\ DV_j = N^0, N^1, \ldots, N^n \end{array} \right\} \quad (2)$$

The illustration of FIG. 4A represents a partitioned memory section array including four memory subsections (m=4) referred to in the present description as phases 0, 1, 2 and 3. Each cell in the memory array is a memory storage location for storing a digital data word. One type of subblock of the memory section may be identified as a group of m storage locations located at the same word address of each of the m memory subsections of a memory section. For maximum throughput rate, then, the time multiplexed address sequence for the memory section should include a traversal of the memory locations through consecutive phases either vertically or another inclined path, for each subblock, but never addressing the same subsection or phase of the memory at consecutive system clock cycles. The term "memory block" for the present description may refer to m·n memory locations which may be required to store a vector or block of digital data words. In the example of FIG. 4A, the denoted block is a 4·3 array of memory locations.

In addition, a digital data word of a vector may be referred to as a vector element and the number of elements in the vector may be expressed by the following equation:

$$\text{Vector elements} = m \cdot n - x \quad (3)$$

where m = multiplex ratio of the time multiplex memory section;

n = smallest number of memory section storage locations required to store the data vector that is divisible by m, i.e. number of subblocks needed to store vector elements;

x = integer value: 0 to (m−1).

This term x will be used significantly in the development of the address sequences for storage and accessing digital data words from partitioned memory sections.

Address sequence developments for a number of examples are illustrated in the FIGS. 4B through 4F. Each of the examples use the 4 to 1 multiplex memory section (m=4) described in connection with FIG. 4A. Only four blocks of the memory section are needed for each example with each block including three subblocks. The index i for the data vector word DVi are recorded in the memory locations to permit full throughput readout of the data vector in a corner turn sequence, in some examples. The following constraints are followed in developing the appropriate address sequence for each case.

1. The developed address sequences for reading or writing blocks of digital words into or out of a block of the memory section are to sequence through the phases of the current subblock independent of the initial phase before advancing to the next subblock of the chosen block.

2. Digital data words of a vector may be read from or written into a memory block addressing the phases thereof in a sequential order, i.e. 0, 1, 2, 3, 0 . . . , or in a reverse sequential order, i.e. 0, 3, 2, 1, 0 . . . .

3. When data is written in a straight sequence, if the data vector has an x value, as described above, of 1 or 3, no phase skip is required between addressing the data vectors in a data vector set, and if the data vector has an x value of 0 or 2, one phase skip may be required between data vectors in a data vector set. When a phase skip is required in the memory addressing for a straight sequence, it is permitted to occur between any subblock either at the beginning or the end of the data vector. FIG. 4B illustrates the phase skip in an address sequence for a data vector, containing twelve data elements, at the beginning of each data vector as they are addressed into their respective data blocks. Each skip is denoted by an asterisk. Conversely, FIG. 4C is an illustrative example having the phase skip at the end of each data vector represented again by an asterisk (note that x=0 for each case 4B and 4C).

4. When data is to be read out in a corner turn sequence, if the data vector has an x value of 1 or 2, the address sequence of the phases in filling up the appropriate subblocks may be sequenced in the reverse sequential order, i.e., 3, 2, 1, 0, 3 .... The example illustrated in FIG. 4E exhibits a case of this type (i.e., x=2). In order to address sequence common vector elements, say like element 3, for example, the phases must be addressed in a reverse sequential order, that is, starting at phase 3 for block 0 and continuing through phases 2, 1, 0 for blocks 1, 2, 3, respectively. Another example of this case is displayed in the diagram of FIG. 4F wherein the data vector includes eleven data elements (i.e., x=1), and if the data vector has an x value of 0 or 3, the phases of the memory section may be sequenced in a straight sequential order. Reference may be made to FIG. 4D for this example. In addressing the common data element 0, for example, the phases are sequenced in a straight sequential order 0, 1, 2, 3 for the blocks 0, 1, 2, and 3, respectively. Accordingly, the other common data vector elements of the data set may be addressed in a similar manner.

5. For straight sequence data sets with more than one data vector, the address sequence for the phases permits skips in accordance with the constraint of Item 3 hereabove. The number of vectors in any data set does not alter the phase skip address sequence.

6. For corner turn sequence data sets with more than one data vector, the address sequence of the phases may be skipped between vectors as a function of the number of vectors in the data set and the vector x value. Table I found herebelow displays the phase skip requirement for multiple vector corner turn sequence data sets for m=4:

TABLE I

MULTIPLE VECTOR CORNER TURN DATA SET SKIP REQUIREMENT
m = 4

| # VECTORS (mod 4) | X VALUE | | | |
|---|---|---|---|---|
| | 0 | 1 | 2 | 3 |
| 0 | 1 | 3 | 3 | 1 |
| 1 | 0 | 2 | 2 | 0 |
| 2 | 3 | 1 | 1 | 3 |
| 3 | 2 | 0 | 0 | 2 |

Figure 5:
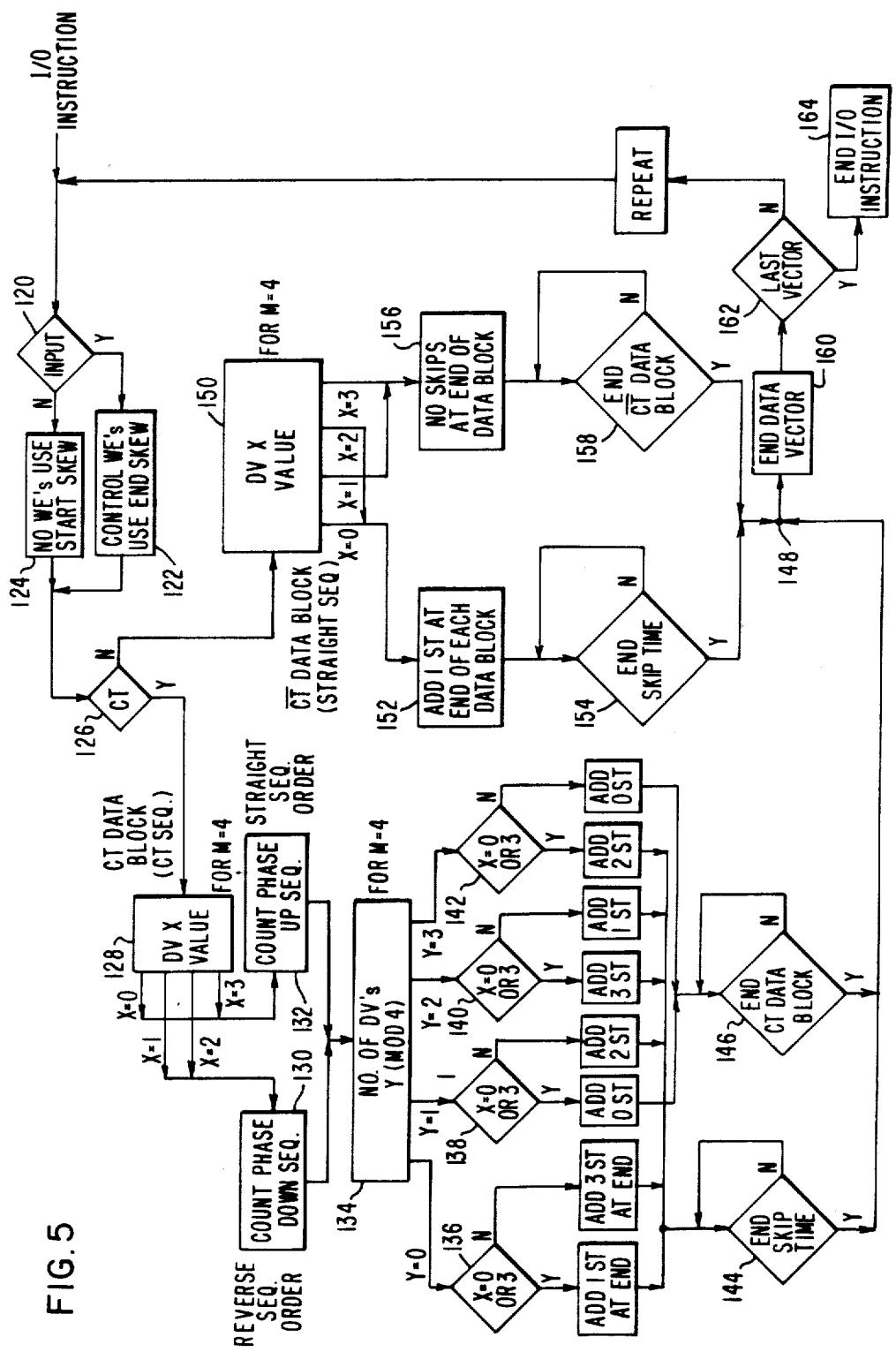
FIG. 5 is a flow chart for illustrating the functional operations of a memory address generator in the memory address sequencing of a memory section similar in method to that described in connection with the arrays of FIGS. 4A–4F.

A sequential flow chart for m=4 illustrating the functional operations of a memory address generator and developing an address sequence including the phase skip requirements is shown in FIG. 5. As described in connection with the embodiment of FIG. 1 provided hereabove, each of the memory address generators respond to instructions data provided thereto. With this in mind, referring to FIG. 5, the decisional block 120 decodes an instruction and determines whether a read or write operation is required. For a write operation, block 122 selects the use of the end skew function and conversely for a read operation, block 124 selects the use of the start skew function both having been described hereabove in connection with the time multiplexed read and write cycle waveforms in FIG. 3. Thereafter, the instruction is further decoded to determine if a corner turn sequence is required utilizing the decisional block 126. For the case in which the instruction indicates a corner turn sequence, the x value of the particular data vector in question is identified by the block 128. The proper phase addressing sequence order is next determined by the blocks 130 and 132 in accordance with the identified x value from block 128. The next block 134 still further decodes the instruction to determine the mod value of the number of data vectors in the data set (note for m=4, the mod 4 value is chosen). Thereafter, the decisional blocks 136, 138, 140 and 142 establish the number of skip time intervals required for the particular address sequence in accordance with the mod 4 representation of the number of data vectors included in the data set. In the event that a skip time is required, the decisional block 144 maintains a delay loop until the required number of skip times have been executed. Where no skip times are required, the decisional block 146 determines if the program is at the end of the corner turn data block. Affirmative decisions of block 144 or 146 bring the program execution to point 148 in the functional flow chart.

Referring back to the decisional block 126, if it is determined that a straight sequential data block is required, then the x value of each data vector therein is identified by the block 150. For the x values 0 and 2, a skip time may be added at the end of each data block, for example, by the instructions of the program block 152. Again, the decisional block 154 may provide a delay loop until the skip time is fully executed. Alternatively, for the x values 0 and 2, the address sequencing may continue between data blocks without a skip time as implemented by the statement of the program block 156 and thereafter, the decisional block 158 determines if the address sequence is completed for the particular straight sequence data block being operated on. Affirmative decisions of decisional blocks 154 or 158 guide the program execution to point 148 which, for the present example, represents the end of the address sequencing of a memory block for a particular data vector in the data set as indicated by the statement of the program block 160. The decisional block 162 determines if all of the data vectors of the data set have been read from or written into the designated memory section. If not, the program execution is repeated at point A. Otherwise, the memory address generator has completed the proper address sequencing for either storing or accessing the number of data blocks for a particular data set in accordance with the instruction provided thereto as indicated by the statement of the program block 164.

For another example, the straight sequence phase skip time requirement and the generation of the address sequence for memory multiplex ratios, m, up to a value of 8 are shown in Table II found herebelow.

TABLE II

| m Memory Multiplex Ratio | DATA SET SKIP REQUIREMENT | | | | | | | |
|---|---|---|---|---|---|---|---|---|
| | Vector X Value | | | | | | | |
| | 0 | 1 | 2 | 3 | 4 | 5 | 6 | 7 |
| 2 | 1 | 0 | | | | | | |
| 3 | 1 | 0 | 0 | | | | | |
| 4 | 1 | 0 | 0 | 1 | | | | |
| 5 | 1 | 0 | 0 | 1 | 2 | | | |
| 6 | 1 | 0 | 0 | 1 | 2 | 3 | | |
| 7 | 1 | 0 | 0 | 1 | 2 | 3 | 4 | |
| 8 | 1 | 0 | 0 | 1 | 2 | 3 | 4 | 5 |

Furthermore, the straight sequence phase skip time values used in Table II and for values of m greater than 8 may be obtained from the following equation:

$$\text{Phase skips} = (m-1) - B \tag{4}$$

where B = vector size (mod m)

m = memory element multiplex ratio.

Moreover, the phase reversal requirements for a corner turn sequence data set for values of m up to a value of eight are illustrated in Table III found herebelow.

TABLE III

CORNER TURN DATA SET PHASE REVERSAL REQUIREMENT

| m Memory Multiplex Ratio | Vector X Value | | | | | | | |
|---|---|---|---|---|---|---|---|---|
| | 0 | 1 | 2 | 3 | 4 | 5 | 6 | 7 |
| 2 | S | S | | | | | | |
| 3 | S | S | R | | | | | |
| 4 | S | S | R | R | | | | |
| 5 | S | S | R | R | R | | | |
| 6 | S | S | R | R | R | R | | |
| 7 | S | S | R | R | R | R | R | |
| 8 | S | S | R | R | R | R | R | R | where S = Straight, R = Reverse

In this case, the phase skip time requirements for multiple vector corner turn data sets may be given by the equation (5) or (6) found herebelow.

Number of phase skips = $(m + 1 - Q)$ mod $m$: for straight phase (5)

Number of phase skips = $(m - 1 - Q)$ mod $m$: for reverse phase. (6)

where m = multiple ratio of the memory section;

Q = (number of vectors) mod m;

Equation (5) applies when Table III indicates that a straight phase sequence, denoted as S, is required.

Equation (6) applies when Table III indicates that a reverse sequence, denoted as R, is required.

Figure 2:
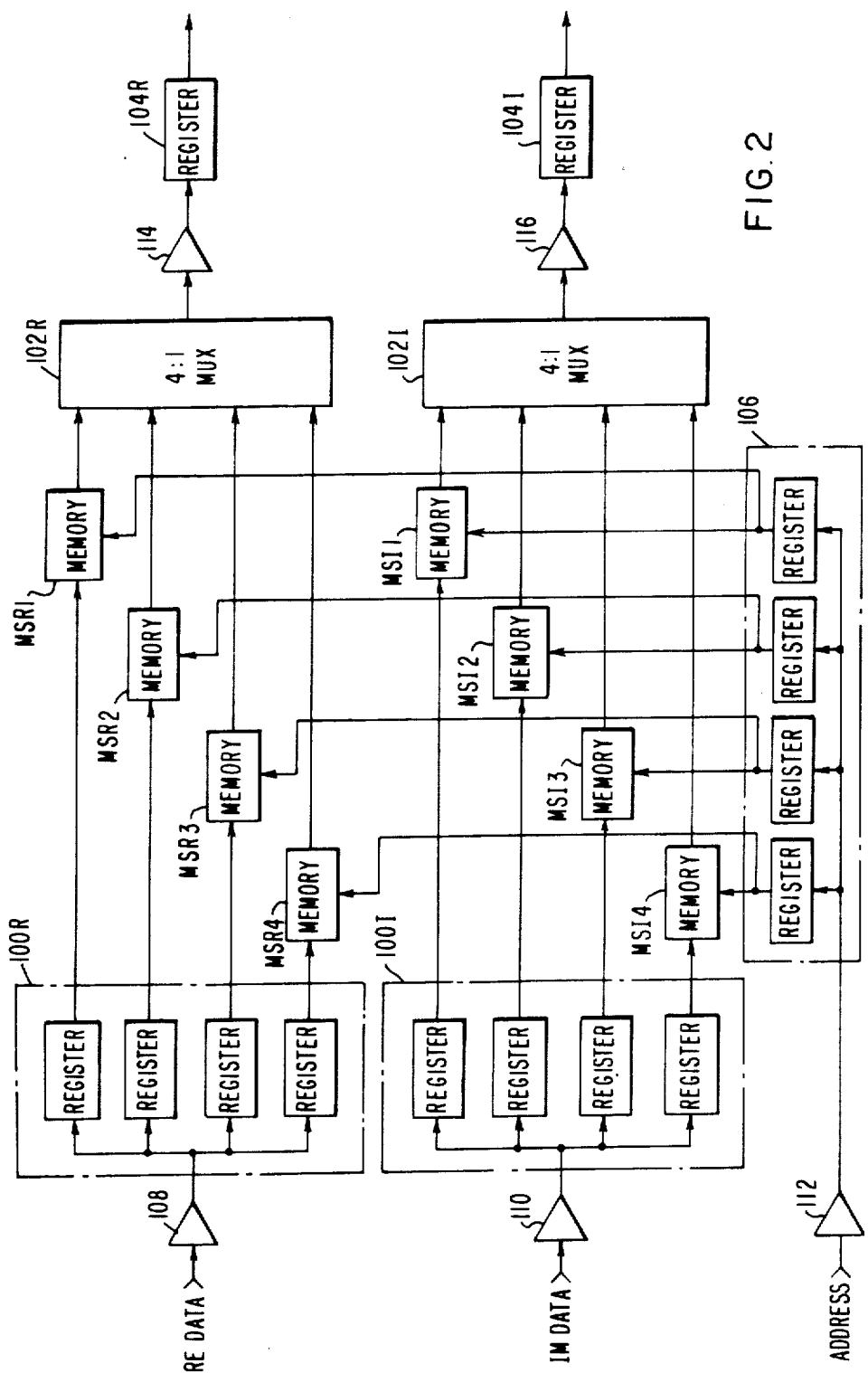
FIG. 2 is a block diagram schematic of a bulk memory arrangement having partitioned memory subsections suitable for use as a time-multiplexed memory in the embodiment depicted in FIG. 1.

Having described the overall programmable memory system architecture in connection with the embodiment of FIG. 1, the time multiplex memory addressing and subdivisions of the partitioned memory sections in connection with FIGS. 2 and 3, and the memory address sequencing developed in the designated memory address generator for a number of particular examples of sequential and non-sequential data vector elements for one or more data vectors in a data set in connection with the FIGS. 4 and 5, the remainder of the specification can now involve the specific details of the various remaining operational circuit blocks of the programmable memory as shown in FIG. 1. First off, the instruction register (IR) associated logic circuit 62 and next instruction register 60 will be described in connection with the specific embodiment shown in FIG. 6.

Figure 6:
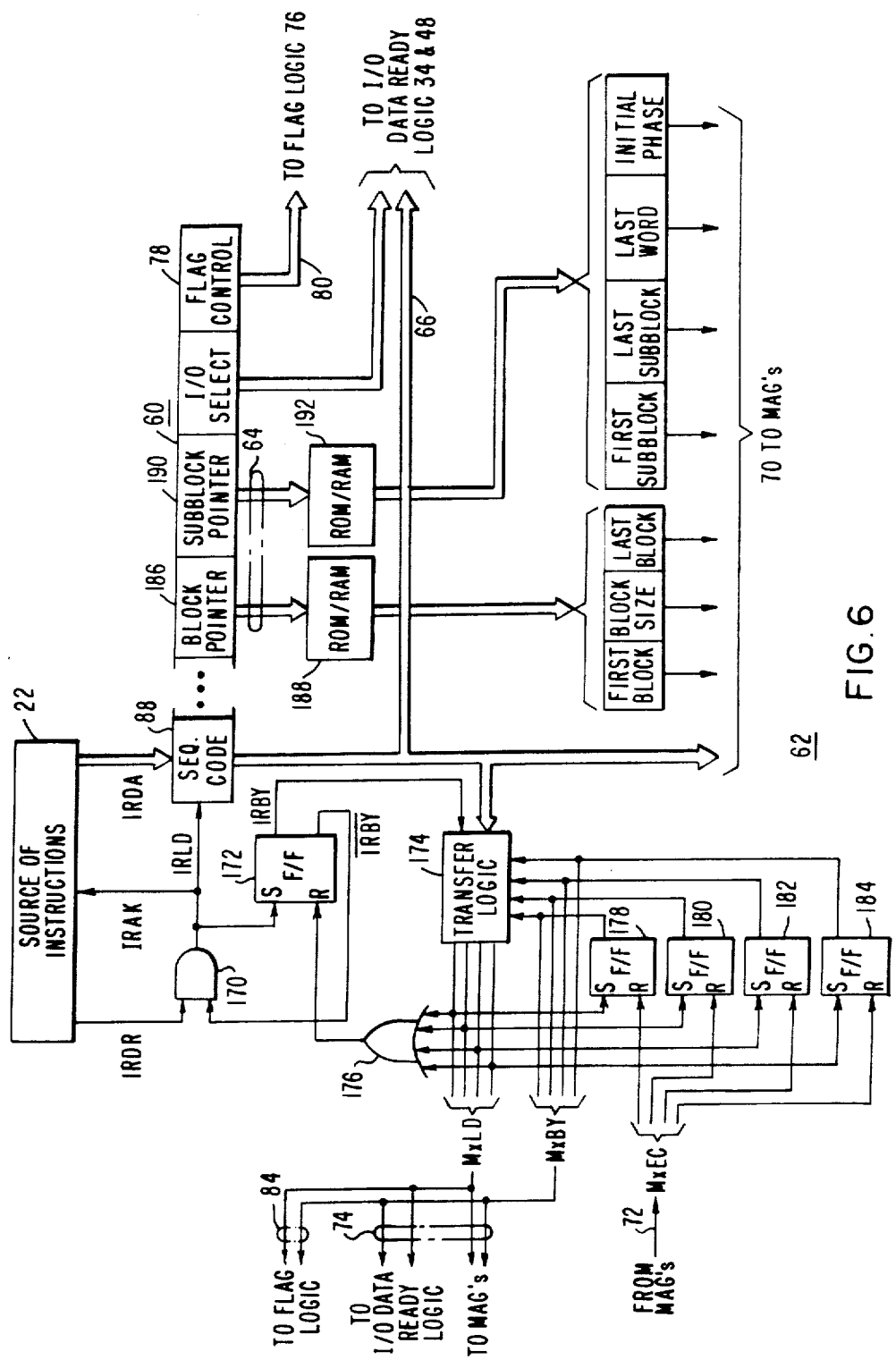
FIG. 6 is a block diagram schematic embodiment of an instruction register and associated logic circuitry suitable for use in the embodiment of FIG. 1.

Referring to FIG. 6, the IRDR signal from the source 22 may be coupled to one input of an AND gate 170 which may be included in the circuit 62. The output of the AND gate 170 may provide the signals IRAK and IRLD. The acknowledgement signal IRAK may be supplied to the source 22 and the loading signal IRLD may be coupled to the next instruction register 60. The instruction data IRDA may be provided from the source to the next instruction register 60. The output of the AND gate 170 may also be coupled to the set input of a flip-flop 172 which has one output signal IRBY provided to a XFER logic circuit 174 and another output signal $\overline{IRBY}$ coupled to the other input of the AND gate 170. The sequence code 88 of the instruction register 60 may also be coupled to the logic circuit 174.

The logic circuit 174 may generate individual memory address generator loading signals, denoted in general as MxLD, which are provided to their respective memory address generators MAGx over signal lines 74. This same group of signals MxLD may be coupled to the inputs of an OR gate 176 which has its output coupled to the reset input of the flip-flop 172. Each of the loading signals MxLD may also be coupled respectively to the set inputs of four flip-flops enumerated as 178, 180, 182 and 184. The output of each flip-flop is representative of a memory address generator busy signal MxBy corresponding to the memory section x associated therewith. The set of memory busy signals MxBY may be provided to both the logic circuit 174 and the memory address generators MAGx over signal lines 74. An end of operating cycle signal, denoted generally as MxEC, may be provided from each of the MAG's over signal line 72 to a respective one of the flip-flops 178, 180, 182 and 184, more particularly to the reset input thereof.

The associated logic circuit 62 may additionally include memory in the form of read only memories ROM or random access memories RAM for storing address sequencing development data pertaining to the block and subblocks of the memory sections which may be indexed by portions of the next instruction. A block pointer section 186 of the instruction word may index a memory 188 in the logic circuit 62 to provide the address sequencing information of the first block, the last block, and the block size of the digital data words to be stored in or read from the designated memory section. Similarly, a subblock pointer 190 portion of the instruction in the next instruction register 60 may index another memory 192 for providing the subblock data pertaining to sequencing the subblocks in the time multiplex operations. This subblock information may include the first subblock, the last subblock, the last word, and the initial phase in the address sequence.

This address sequencing data may be supplied over signal lines 70 to the memory address generator as designated by the memory code Mx in the sequence code portion 88 of the next instruction register 60. This same sequence code 88 may also be provided to the data ready logic circuits 34 and 48 over signal lines 66 along with the I/O select code (W, Iy or $\overline{W}$, Oz). In addition, the flag control data portion 78 of the instruction word may be supplied to the flag logic circuit 76 utilizing signal lines 80. Moreover, the sets of signals MxLD and MxBY may also be provided to the data ready logic circuits 34 and 48 over signal lines 74 and in addition the set of signals MxLD may further be provided to the flag logic circuit over signal lines 84. Accordingly, the groups of signals MxLD, MxBY and MxEC are representative of the states of operation of the various memory address generators and may be used as logical conditions for the logic circuit 62 especially pertaining to the transfer of instruction data words to the various memory address generators.

In a typical operation, the source 22 provides the data ready signal IRDR to the circuit 62 when an instruction data word is ready to be loaded into the next instruction register 60. If none of the loading signals MxLD are active, the OR gate 176 resets the flip-flop 172, bringing the signal $\overline{IRBY}$ positive, which is indicative of a non-busy state. Under these conditions, the AND gate 170 effects the acknowledge signal IRAK and loading signal IRLD which are provided to the source 22 and next instruction register 60, thereby updating the next instruction register 60 with the data IRDA. Concurrently, the flip-flop 172 is set, rendering the signals IRBY and $\overline{IRBY}$ positive and negative, respectively.

The new instruction data in register 60 is then supplied to the various operational blocks either directly or through the memories 188 and 192, as the case may be. The XFER logic circuit 174 identifies the designated memory address generator by the memory address Mx in the sequence code 88 provided thereto and if that particular MAGx is not busy as determined by monitoring the set of signals MxBY, then the appropriate loading signal MxLD is set and supplied to the memory address generator x as well as to the data ready logic circuits 34 and 48 to load the new instruction information in registers included therein. Subsequently, the OR gate 176 detects the setting of the designated loading signal MxLD and resets the flip-flop 172 which indicates to the logic circuit 174 and AND gate 170 that the new instruction data has been registered in the designated operating units of the programmable memory and the next instruction register 60 is ready to accept another instruction from the source 22.

In addition, the designated loading signal MxLD sets the corresponding flip-flop 178, 180, 182 or 184 which in turn provides the state of its output signal MxBY to the logic circuit 174, and to the memory address generators MAGx and data ready logic circuits 34 and 48 over signal lines 74. As long as the designated memory address generators are busy executing the instruction stored in registers therein, the busy signal MxBY corresponding thereto will remain positive as an indication of this busy state. At the completion of the generation of an address sequence, the corresponding end of cycle signal MxEC is supplied to the flip-flop 178, 180, 182 or 184 associated therewith for resetting purposes. The corresponding busy signal MxBY is thus negated indicating that the memory address generator is no longer in an operational or address sequence generation state and is available to accept another instruction. In this manner, any one or all of the memory address generators may be supplied with an instruction and may develop a memory address sequence in accordance therewith both independently and simultaneously.

Figures 6A, 6B:
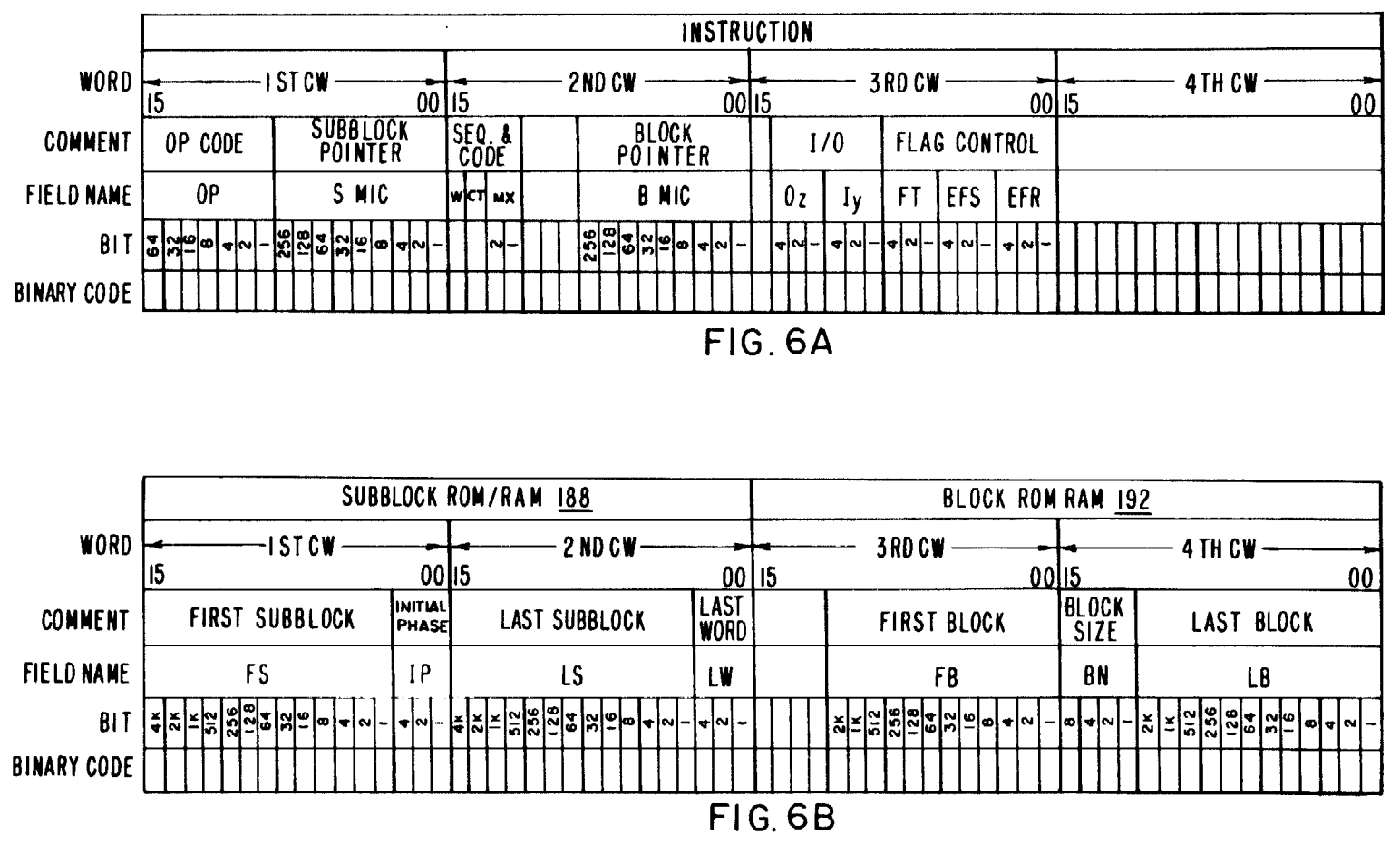

A typical instruction word format is shown in FIG. 6A and in addition, typical formats for the instruction data words indexed from the memories 188 and 192 are shown in FIG. 6B. A definition of the instruction signal Mnemonics are provided in the Table IV found herebelow. Reference may be made to the various instruction fields shown in FIGS. 6A and 6B with regard to describing the various other operating units of the programmable memory herebelow.

TABLE IV

TYPICAL INSTRUCTION FORMAT FIELD DEFINITION

| | |
|---|---|
| OP: | The OP Code field is used by the instruction controller, like a signal processor, for example, to determine the instruction type. |
| SMIC: | The SMIC field contains an address value that points to the subblock ROM/RAM. |
| W: | The W field is part of the sequence code. W = 1 indicates a Write or input instruction and W = 0 indicates a read or output instruction. |
| CT: | The CT field, when equal to one, indicates a corner turn data set. When CT = O, this field indicates a straight data set. |
| Mx: | The Mx field identifies which memory section is to be used with this instruction. |
| BMIC: | The BMIC field contains an address value that points to the block ROM/RAM. |
| FT: | The FT field identifies the flag that must be set to a logic 1 to permit this instruction |

TABLE IV-continued

TYPICAL INSTRUCTION FORMAT FIELD DEFINITION

| | |
|---|---|
| | sequence. When the FT field equals 0, the instruction is independent on the flag logic. |
| EFS: | The EFS field identifies the flag that will be set to a logic 1 at the last clock cycle of this instruction. An EFS field equal to zero indicates that no flag will be set to a one. |
| EFR: | The EFR field identifies the flag that will be reset to a logic 0 at the last clock cycle of this instruction. An EFR equal to zero indicates that no flag will be reset by this instruction. |
| FS: | The FS field is contained in the subblock ROM/RAM and is the value for the first subblock. |
| IP: | The IP field, contained in the subblock ROM/RAM, is the value for the initial phase. |
| LS: | The LS field, contained in the subblock ROM/RAM, is the value for the last subblock. |
| LW: | The LW field, contained in the subblock ROM/RAM, is the value for the last word. |
| FB | The FB field, contained in the block ROM/RAM, is the value for the first block. |
| BN: | The BN field, contained in the block ROM/RAM, is the value for the power of two exponents that represent the block size. |
| LB: | The LB field, contained in the block ROM/RAM, is the value for the last block. |
| Iy: | The Iy field indicates the Input Data Source used by the instruction. |
| Oz: | The Oz field indicates the output destination used by the instruction. |

In connection with the description of the remaining operating units of the programmable memory, a description and definition of the major timing signals and their Mnemonics is provided in Table IA found in the Appendix to the specification. The Table IA includes definitions of the prefixes and suffixes of the various signal Mnemonics and a description of each timing signal including the combinational logic equations used in the derivation thereof. Reference to the Appendix should be made as needed for a better understanding of the descriptions of FIGS. 7, 8A, 8B, 9 and 10.

Figures 7, 7B:
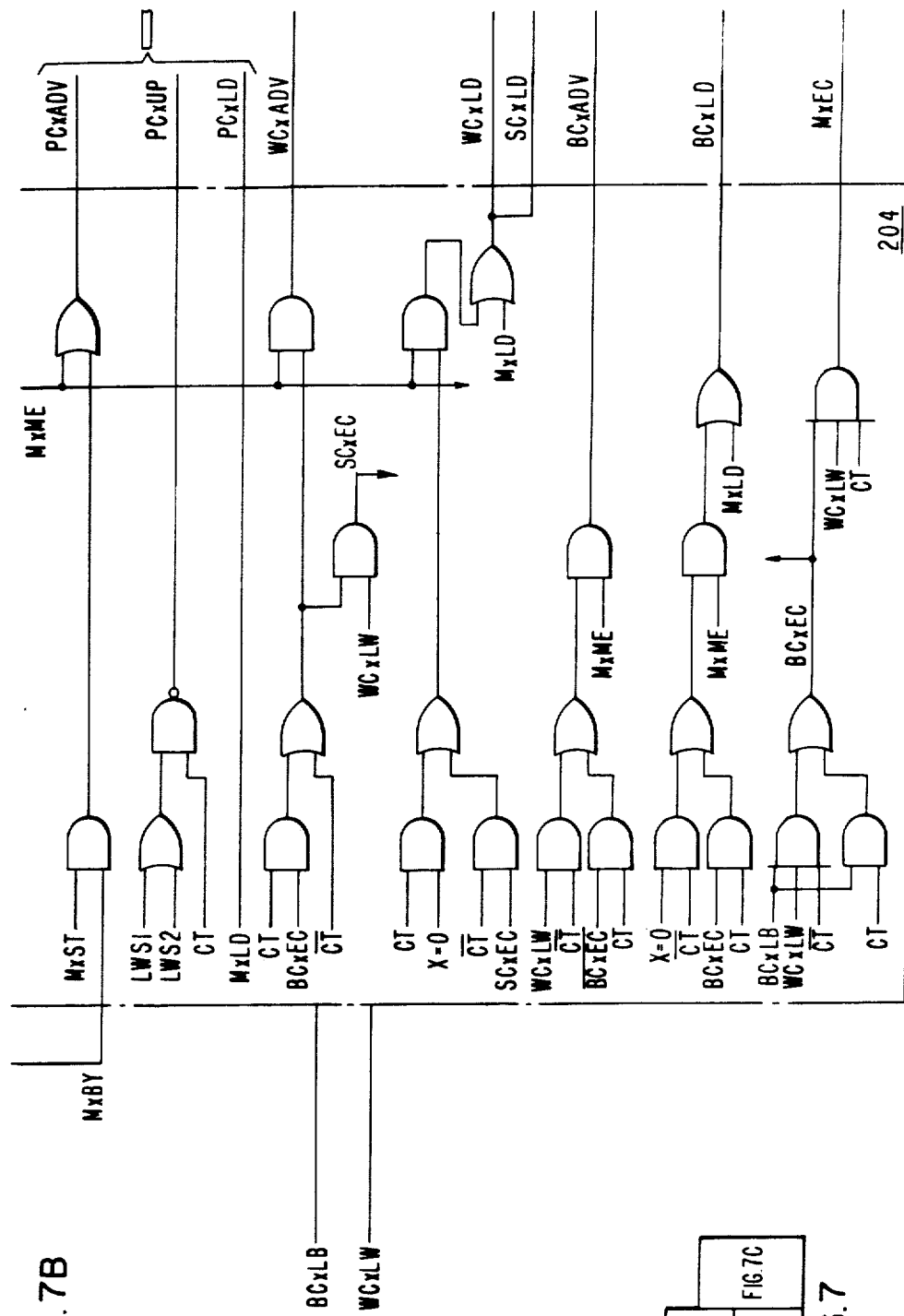
FIG. 7 includes FIGS. 7A, 7B and 7C which compositely form a schematic block diagram of a memory address generator embodiment suitable for use in the programmable memory depicted in FIG. 1.

The first of the remaining operational units of the programmable memory embodiment as described in connection with FIG. 1 to be described is the memory address generator. A typical embodiment suitable for use in the programmable memory of FIG. 1 is shown in FIG. 7 which is a composite of FIGS. 7A, 7B and 7C. For the present embodiment, the block diagram schematic as depicted in FIG. 7 (i.e., 7A, 7B and 7C) is representative of the circuitry which may be found in each of the memory address generators of the embodiment of FIG. 1. In general, each memory address generator MAGx provides the timing for the programmable memory instruction execution and generates the various address sequences required by the programmable memory instruction. Each MAG develops the address sequencing as described hereabove specifically for the embodiment including four subsections (i.e., m=4) for its corresponding partitioned memory section.

Figure 7A:
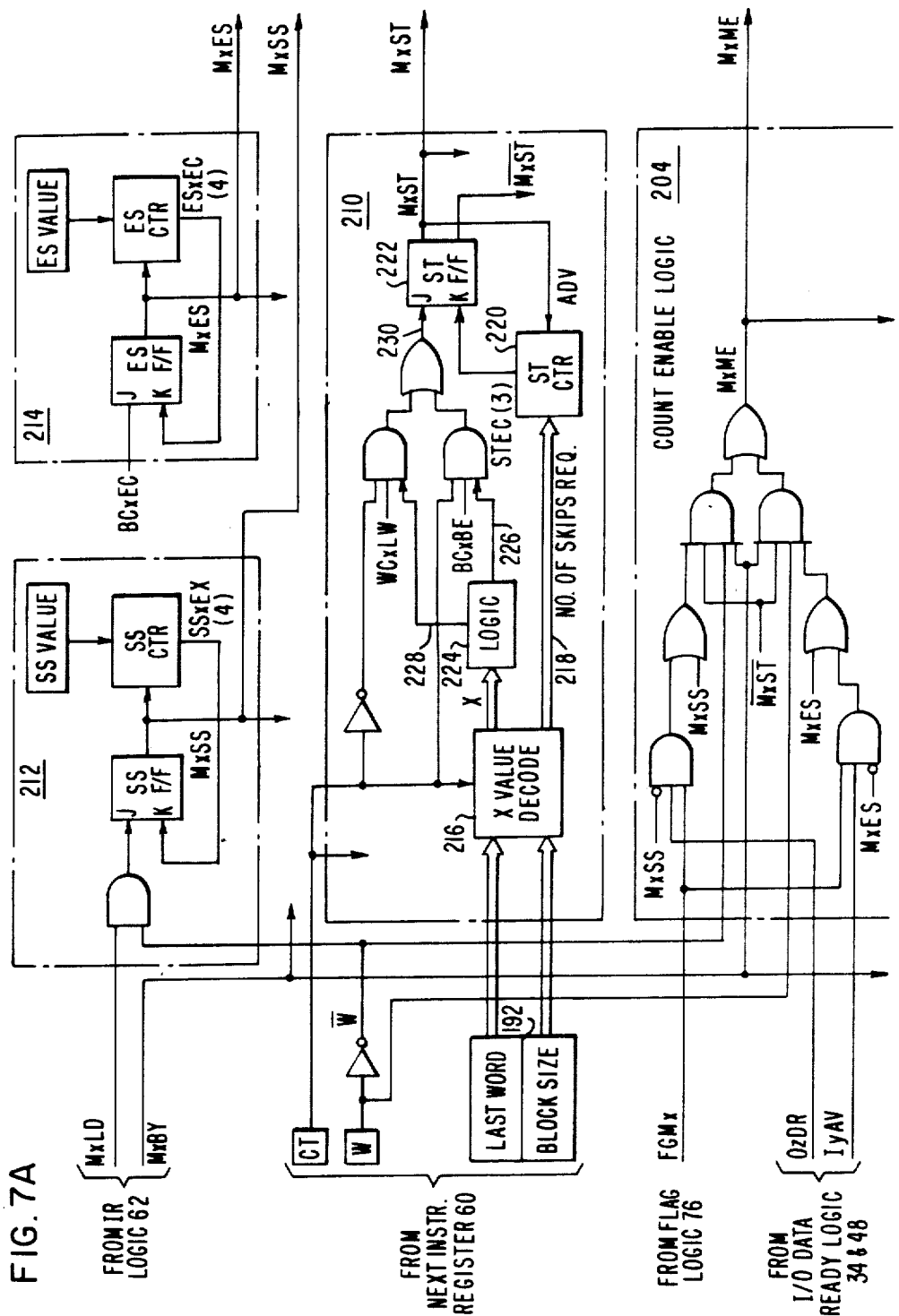
Figure 7C:
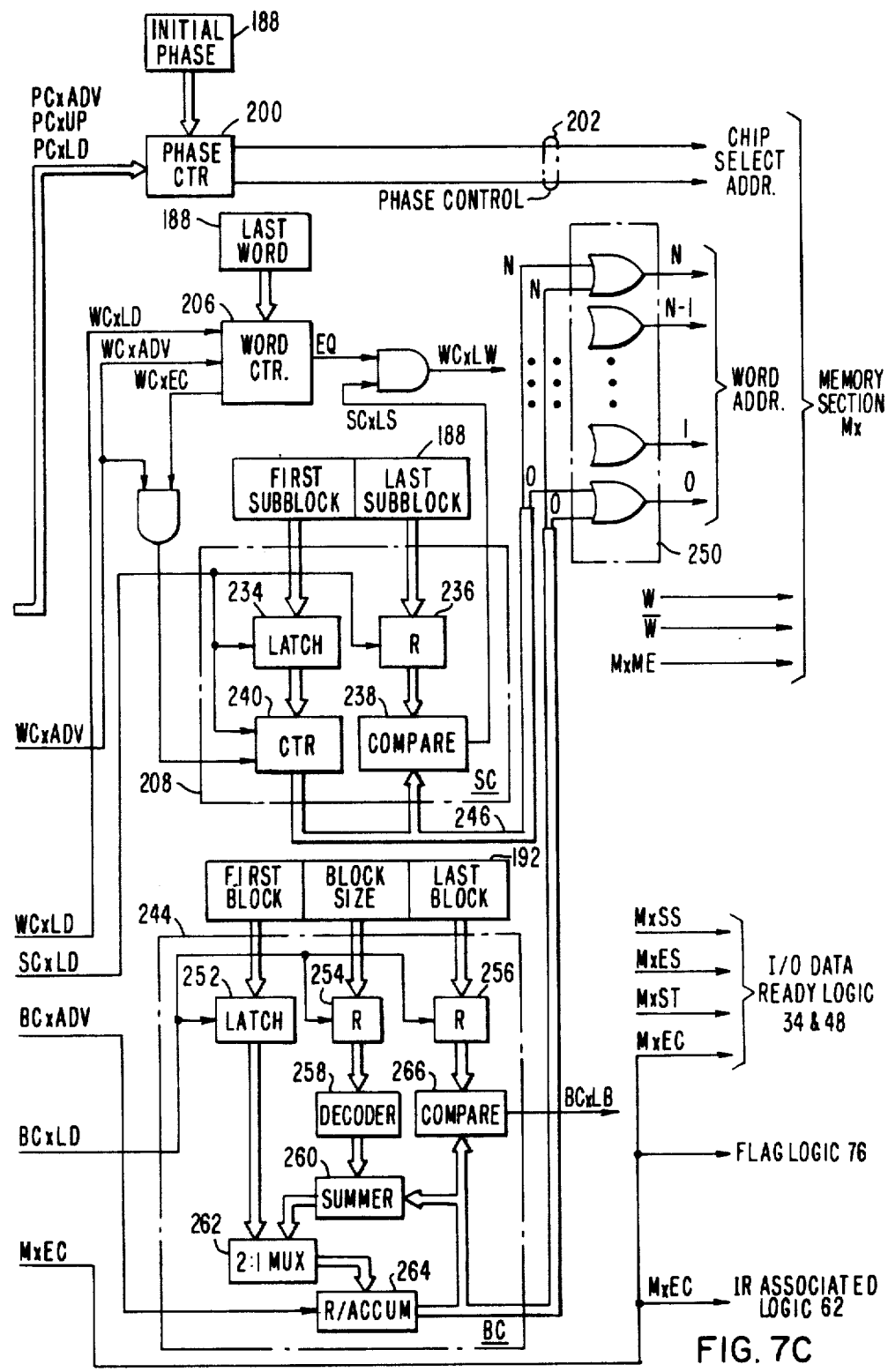

Referring to FIGS. 7A, 7B and 7C, a phase counter 200 may be included in each MAGx to generate the address sequencing for the memory subsections or phases in connection with the time multiplexed operation of the corresponding memory section. For example, with m=4, the phase counter 200 may be a two bit counter generating four phase addresses over the signal lines 202. In operation, the phase counter 200 is provided with an initial phase value from the instruction word 188 and is responsive to a plurality of logical signals, denoted as PCxLD, PCxADV and PCxUP which are generated in a count enable logic circuit 204 also included as part of the MAGx embodiment. Accordingly, the phase counter 200 may advance during valid system clock cycles as defined by the corresponding memory master enable signal MxME and during memory skip times in accordance with the logic circuitry found in the circuit 204. (Refer to Table 1A in the Appendix for the definition of the aforementioned logical signals.)

Further included in each MAGx may be a word counter 206 which generally contains the same number of bits as the phase counter 200 and advances during valid system clock cycles, but not during the identified skip times (see FIG. 4). The word counter 206 utilizes the last word information provided thereto from the instruction 188 and operates in response to the logical signals WCxLD, WCxADV and WCxEC which are developed in accordance with the combinational logic circuits of the count enable logic circuit 204. Reference may be made again to the Table 1A in the Appendix for a definition of these logic control signals.

Further included in the MAGx embodiment are a skip time counter circuit 210, a start skew counter circuit 212 and an end skew counter circuit 214. The skip time counter circuit 210 may include an X value decode circuit 216 which responds to the last word and block size values of the instruction word 192 to generate an X value and a signal 218 representative of the number of skips required between data vectors. A skip time counter 220 responds to the signal 218 and is operative to advance through its digital codes. For an embodiment in which m=4, the counter 220 may include two bits and cycle through up to four states, for example. At the completion of each cycle, the counter 220 may generate a skip time end cycle signal, denoted as STEC, which may be coupled to the K or reset input of a skip time flip-flop 222. Moreover, the generated X value from the decoder 216 may be further logically decoded in the logic circuit 224 to generate signals 226 and 228 which may be combined with other logical signals such as WCxLW, BCxBe, CT and $\overline{CT}$ to generate a logical signal 230 which is coupled to the J or set input of the flip-flop 222. The skip time flip-flop 222 generates a memory skip time signal MxST in response to the generation of the logical signal 230 and conversely generates the complement thereof $\overline{MxST}$ in response to the generation of the signal STEC.

Generally, when the memory skip time signal MxST is generated, the phase counter 200 will skip to a new count without storing or accessing digital data words into the memory subsection associated therewith. This may be observed through inspection of the logical circuitry of 204 which generates the logical signals governing the phase counter 200. During the generation of the signal MxST the counter 220 may advance through its states until it reaches the required number of skips, the value of which being provided over signal lines 218 thereto. Coincidental with this event, the signals STEC resets the flip-flop 222 to negate the signal MxST and generate its complement $\overline{MxST}$. The counter 220 may also be reset to zero at this time.

The start skew counter circuit 212 is operative in response to the logical signals MxLD and $\overline{W}$ to generate a start skew memory signal, denoted as MxSS. Similarly, the end skew counter circuit 214, is operative in response to the logical signal BCxEC to generate a memory end skew signal denoted as MxES. The operation of the circuit blocks contained in each circuit 212 and 214 are considered well known to anyone skilled in the pertinent art and for this reason, no discussion of them will be made at this time.

A subblock counter circuit 208 may be comprised of a latch register 234, a holding register 236, a compare circuit 238 and a digital counter 240. The latch register 234 and holding register 236 receive the information of the first subblock and last subblock of the address generation sequence from the data instruction 188 (see FIG. 6B). The loading of the registers 234 and 236 is governed by the logical signal SCxLD and the governing of the counter 240 is accomplished by a combination of signals including WCxADV and WCxEC. The logical signal WCxADV is developed in the count enable logic circuit 204 while the logical signal WCxEC is generated by the word counter 206 at the end of each counting cycle. The output of the counter 240 represents the address of the subblock in the generated address sequence for memory Mx and is supplied as one input to the compare circuit 238. The other input to the compare circuit 238 is supplied from the last subblock register 236.

In operation, the latch register 234 and holding register 236 load the first subblock and last subblock addresses of instruction 188 therein, respectively, as controlled by the logical signal SCxLD. The first subblock address is loaded into the counter 240 as an initial counting point. Thereafter, each time the word counter cycles through the number of words in a subblock, the counter 240 is governed to increment its subblock address. This process continues until the address in the counter 240 coincides with the last subblock address as determined by the comparator 238. The comparator 238 generates a signal, denoted as SCxLS, which is representative of the counter 240 reaching the last subblock address. Each time there is coincidence between the address of the last word indicated by the signal 242 from the word counter 206 and the last subblock signal SCxLS, a last word in the vector signal, denoted by the mnemonic WCxLW, is generated.

The final primary operational element included in the MAGx is a block counter circuit as shown at 244. In operation, the block counter circuit 244 generates the block address for the memory section Mx coupled to the MAGx. In the particular embodiment, the individual address signals of the subblock counter over signal lines 246 are OR'ed correspondingly with the individual signals of the address generated by the block counter 244 over signal lines 248 in the circuit 250. In this arrangement, the position of the block counter's least significant bits is dependent on the block size of the data vector, i.e. the number of subblocks. Thus, the output of the OR gates 0-N of circuit 250 are provided as the digital word address for the memory Mx. In essence, this address over signal lines 0-N may be the common memory location address for the group of memory subsections constituting a subblock, in some cases.

The block counter 244 may be comprised of a latch register 252, two holding registers 254 and 256, a decoder 258, a summer 260, a 2-to-1 multiplexer 262, a register accumulator circuit 264 and a compare circuit 266. The combination of these elemental circuit elements of the block counter 244 function together analogously to those of the subblock counter 208 described supra. The first block address, the block size, and the last block address are provided respectively to the latch register 252, the holding register 254, and the other holding register 256 from the instruction word 192 (see FIG. 6B). The loading of this digital data is governed by the logical signals BCxLD generated by the combination of logic circuits in the count enable logic unit 204.

In the present embodiment, the block size value is directed to the decoder circuit 258 via register 254. The output of the decoder 258 is coupled to one input of the summer 260 with the other input thereof being coupled to the output of the accumulator circuit 264 which is also the block counter address generated over signal lines 248. The output of the summer 260 is coupled to one input of the multiplexer 262 with the other input being coupled to the output of the latch register 252. The output of the multiplexer 262 may be loaded into the accumulator 264 under direction of the logical signal BCxADV which is generated by another logic circuit included in the count enable logic unit 204. The output of the accumulator 264 may also be coupled to one input of the comparator 266 with the other input being coupled to the output of the holding register 256. The comparator is operative to generate a signal denoted as BCxLB which is representative of the address counter reaching the last block address of the developed address sequence.

In operation, the latch register 252 after being loaded with the first block address from the instruction 192 passes the address data to the multiplexer 262 which is operated in a position to provide the first block address to the register/accumulator circuit 264. Thus, the initial block counter address over signal lines 258 is the first block address of the instruction 192. Concurrently, the block size which was loaded into the register 254 may be decoded in 258 and provided to the summer 260 to be added to the present block counter address to form the next block counter address. The addition result is provided through the multiplexer 262 and loaded into the register/accumulator 264 to update the block counter address as governed by the logical signal BCxADV. During this operation, the block counter addresses are repetitively compared with the last block address via register 256 in the compare circuit 266 and the logical signal BCxLB is generated at the condition of equality between the two addresses.

The logic circuitry of the count enable logic unit 204 is patterned, in general, after the definitions given for the logical signals of the programmable memory in Table IA of the Appendix. Since the symbols used for the logic operations performed in the count enable logic block 204 are considered well known to all skilled in the pertinent art, the internal combinational logic operations thereof may be fully understood by following the diagrams shown in FIG. 7. Therefore, there will be no detailed discussion of these logical operations; however, if more detailed information is desired, reference may be made to the definitions given in Table IA of the Appendix. The logical signals which are provided to the MAG's from the other operational units of the programmable memory such as the I/O data ready logic units 34 and 48, the flag logic unit 76 and the IR associated logic unit 62 have either been discussed hereabove or will be discussed in greater detail in connection with the remaining figures.

Figure 8A:
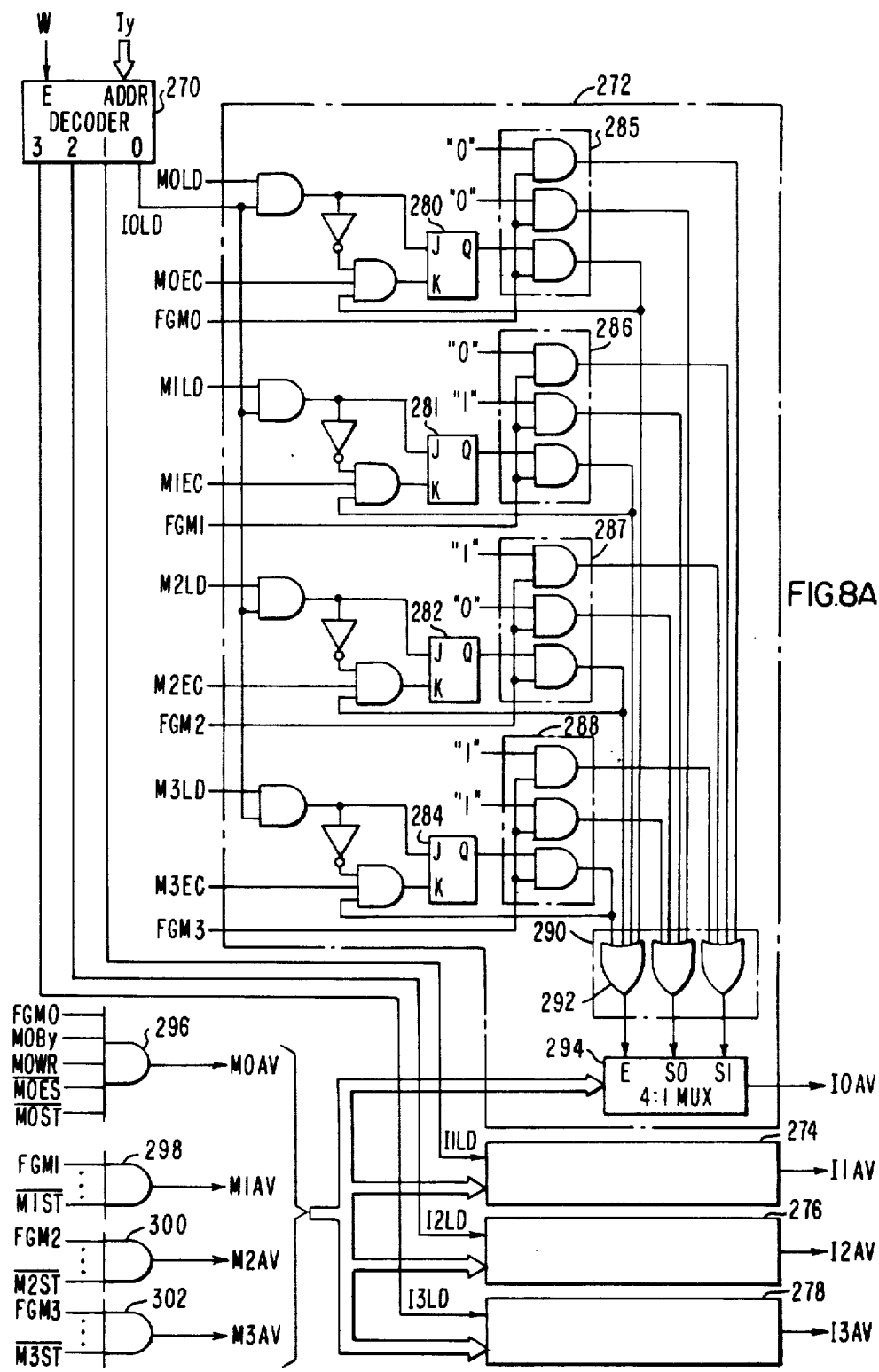
FIGS. 8A and 8B are block diagram circuit schematic embodiments of an input data ready logic circuit and an output data ready logic circuit, respectively, suitable for use in the programmable memory embodiment of FIG. 1.
Figure 8B:
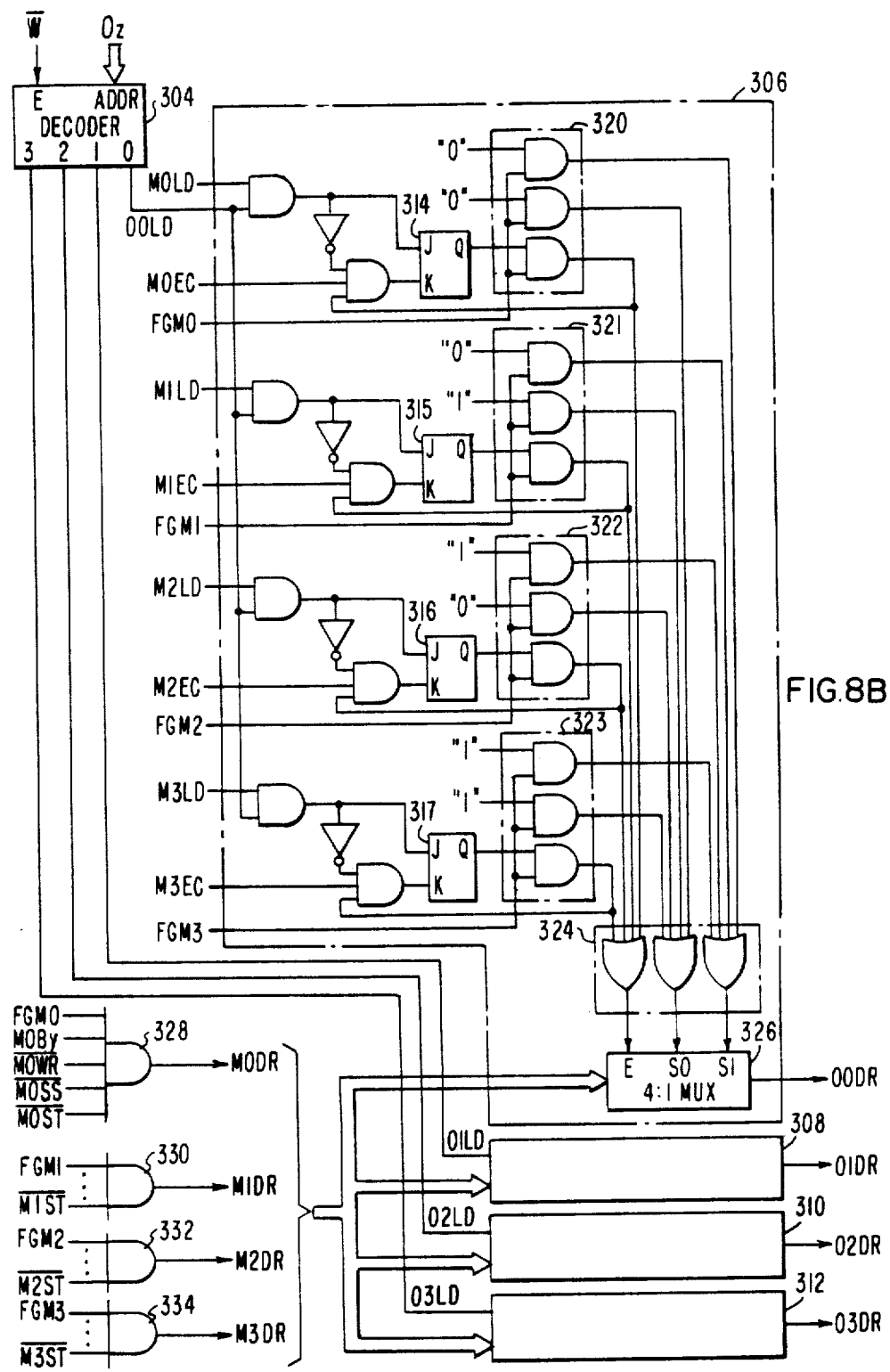

Exemplary embodiments of the input data ready logic circuit and output data ready logic circuit 34 and 48, respectively, suitable for use in the programmable memory embodiment of FIG. 1 are depicted in schematic block diagram form in FIGS. 8A and 8B, respectively. It is understood that while the embodiments for the input and output data ready logic circuits are directed to a programmable memory of only four partitioned sections, they are obviously not limited to any given number and may be expanded or modified to comply with and operate with respect to any number of sections that the programmable memory may be partitioned into. With this in mind then, a description of the particular embodiments will be started.

Referring to FIG. 8A, the input data ready logic circuit 34 may be operative to generate the input available signals IyAV which along with the data ready signals of the source data handling units provide the programmable memory timing philosophy of transfer data on coincidence therebetween. Thus, the purpose of the circuit 34 is primarily for identifying the conditions which permit the storage of digital data words into one of the programmable memory's partitioned sections in accordance with the programmable memory instructions. As described hereabove in connection with the embodiment of FIG. 1, the input available signals IyAV and source data ready signals are assumed to be synchronized to the throughput system clock of the programmable memory (not shown). In the event that the source data handling units cannot provide a synchronized data ready signal, it is understood that some other type of synchronizing logic can be easily added to the programmable memory design without deviating from the broad principles of the present invention since these types of designs are generally well known to those skilled in the pertinent art. Accordingly, the primary outputs of the input data ready logic circuit 34, the input y available signals IyAB, indicate when the designated memory section x is ready to receive digital data words from the input y. Further definitions of these input available signals are provided in Table IA of the Appendix.

Referring to FIG. 8A, a decoder circuit 270 has coupled to the enable E and address inputs thereof the logical signals W and Iy provided thereto from the next instruction register 60. The decoder 270 is operative to generate signals IxLD for each of four logical circuits 272, 274, 276 and 278 which, under the proper conditions, may generate the input available signals I0AV, I1AV, I2AV and I3AV, respectively. Each of the logical circuits 272, 274, 276 and 278 may include four inputs busy flip-flops 280-284. The set of memory load signals, denoted generally as MxLD, is provided to each of the logical circuits 272, 274, 276 and 278 wherein each memory load signal of the set is coupled to a corresponding flip-flop 280, 281, 282 and 284. The memory load signals MxLD operate cooperatively with the input load signals IxLD generated by the decoder 270 in a matrix type arrangement to set one of the input busy flip-flops designated by the combination of signals. For example, if input zero (i.e., y=0) was selected by the input select code Iy via decoder 270 and memory section 1 was selected to store digital data words, then the flip-flop 281 in the logical circuit 272 would be set accordingly.

Associated with each of the busy flip-flops 280-284 in each logical circuit is a combination of AND gates, like that shown at 285 through 288, for example, which produce a digital code in each case representative of the memory corresponding to the busy flip-flop. The combination of AND gates for each flip-flop may become operative in response to a respectively corresponding flag signal FGM0-FGM3 to generate a corresponding memory code. The flag signals FGM0-FGM3 are generated, in the present embodiment in the flag logic circuit 76 and provided as a group to each of the logical circuits 272, 274, 276 and 278 to act as permissives therein. The outputs of common AND gates of the combinations of AND gates 285, 286, 287 and 288 are grouped together and coupled to the inputs of corresponding OR gates of an OR gate circuit 290. In the present embodiment, the common outputs of the AND gates which are associated with the setting of the busy flip-flop logic signals are coupled to the inputs of an OR gate 292 whose output is coupled to the enable input of a 4-to-1 data word multiplexer 294. In addition, the outputs of the AND gates which are representative of the memory codes are coupled to other OR gates in the circuit 290 whose outputs are utilized as the address code for the multiplexer 294.

In each of the logical circuits 272, 274, 276 and 278 the multiplexer circuit 294 has its inputs coupled correspondingly to a set of memory available signals M0AV–M3AV, each being indicative that the memory section represented thereby is available for storage of digital data words therein. Each of the memory available signals MxAV may be generated as a function of the combination of logical signals FGMx, MxBY, MxWR, $\overline{\text{MxES}}$, $\overline{\text{MxST}}$ utilizing the logic circuits of blocks 296, 298, 300 and 302 in each case. The outputs of the multiplexer circuits 294 of each of the logical circuits 272, 274, 276 and 278 are the input available signals I0AV, I1AV, I2AV and I3AV, respectively. Moreover, a set of memory end cycle signals M0EC–M3EC may be provided to each of the logical circuits 272–278 for coupling correspondingly to the reset inputs of their respective busy flip-flops for resetting the outputs thereof. Other conditional logic circuitry may be included in each of the logical circuits 272–278 to protect against false reactions to signal noise, for example, and are generally considered well known techniques to anyone skilled in the pertinent art.

In describing the operation of the data ready logic circuit 34 of FIG. 8A, reference is again made to the example in which the input y=0 is expected to provide digital data words to the memory section 1 in which case the busy flip-flop 281 is set true. As a result, the multiplexer circuit 294 in the logical circuit 272 is enabled via AND gates 285 and OR gate 292 and the address corresponding to memory section 1 is provided to the address inputs thereof through the AND gate circuit 286 and additional OR gates of circuit 290 to select the memory available signal M1AV. In the event that the memory M1 is available for storage of digital data words therein at this time, the output signal I0AV will be set. Also, should the selected source data handling unit be ready to transfer data to memory 1, then coincidence of signals exist and the transfer of digital data words takes place in accordance with the address sequence generation of MAG1. At the end of the digital data word transfer into memory 1, the end cycle signal associated with MAG1, namely M1EC, is set and consequently, the busy flip-flop 281 is reset. Accordingly, the multiplexer 294 is disabled as a result and the input available signal I0AV returns to zero. Thus in the manner just described, any input may be coupled to any memory section by the input select circuit 32 and the input data ready logic circuit 34 identifies when data transfer may be permitted therebetween.

The output data ready logic circuit embodiment 48 depicted in FIG. 8B is similar in circuit arrangement to that of the input data ready logic 34 in that it includes a decoder circuit 304 for logical circuits 306, 308, 310 and 312. In addition, each logical circuit 306–312 includes four busy flip-flops, 314–317. Moreover, associated with each busy flip-flop is included a combination of AND gates 320–323, respectively for purposes of memory encoding. Each logical circuit also includes a similar grouping of the common outputs of the combinations of AND gates 320–323 and similar coupling arrangement to the inputs of OR gates in an OR gate circuit 324. Likewise, the outputs of the OR gates 324 are coupled to the enable and address inputs of a multiplexer circuit 326 for each logical circuit 306–312.

The primary differences between the input and output data ready logic embodiments of FIGS. 8A and 8B are that the enable and address inputs of the decoder 304 are the $\overline{\text{W}}$ and Oz digital coded signals from the next instruction register 60, the outputs of the multiplexer circuits 326 are representative of the memory output data ready signals OxDR, and the set of inputs to each of the multiplexer circuits 326 are the memory data ready signals M0DR–M3DR. Each memory data ready signal MxDR may be generated as a function of the combination of logical signals FGMx, MxBY, $\overline{\text{MxWR}}$, $\overline{\text{MxSS}}$, and $\overline{\text{MxST}}$ which may be operated on in the logical blocks 328, 330, 332 and 334 to effect the memory data ready signals M0DR–M3DR, respectively. The remaining circuit arrangement of the output data ready logic circuit embodiment depicted in FIG. 8B and the operation thereof along with the interconnection of the logical signals from the other of the operational units of the programmable memory is similar to that of the input data ready logic circuit embodiment as described in connection with the FIG. 8A.

The output data ready logic circuit 48 is operative to generate memory output data ready signals which cooperate with the destination ready signals as shown in the embodiment of FIG. 1 to effect the programmable memory timing philosophy of transfer on coincidence to transfer digital data words between the selected memory section and destination handling unit. Thus, the logic circuit 48 is operative in accordance with programmable memory instructions which direct the reading of digital data words from one of the programmable memory sections. The output data ready signals OzDR and the destination ready signals are assumed to synchronized to the throughput system clock used in the programmable memory to permit digital data word transfer between a memory section and a destination handling unit. If the destination data handling unit does not provide synchronized data ready signals, synchronizing logic may be easily added to the programmable memory embodiment by anyone skilled in the pertinent art and the resulting addition or modification will not deviate from the broad principles of the present invention.

As has been shown by the embodiment depicted in FIG. 8B, the primary outputs of the output data ready logic circuit are the output z data ready signals OzDR which indicate when the memory x section is ready to send data to an output z in accordance with the address sequence generated by the memory address generator as directed by the programmable memory instructions provided thereto. Consequently, a programmable memory instruction directing that destination z receive digital data words from memory section x may not proceed if the current instruction is either directing the MAGx through an address sequence or utilizing destination z. Thus, the output data ready logic circuit provides the output data ready signals which in conjunction with the destination ready signals compositely implement the transfer on coincidence time philosophy of the programmable memory.

Figure 9:
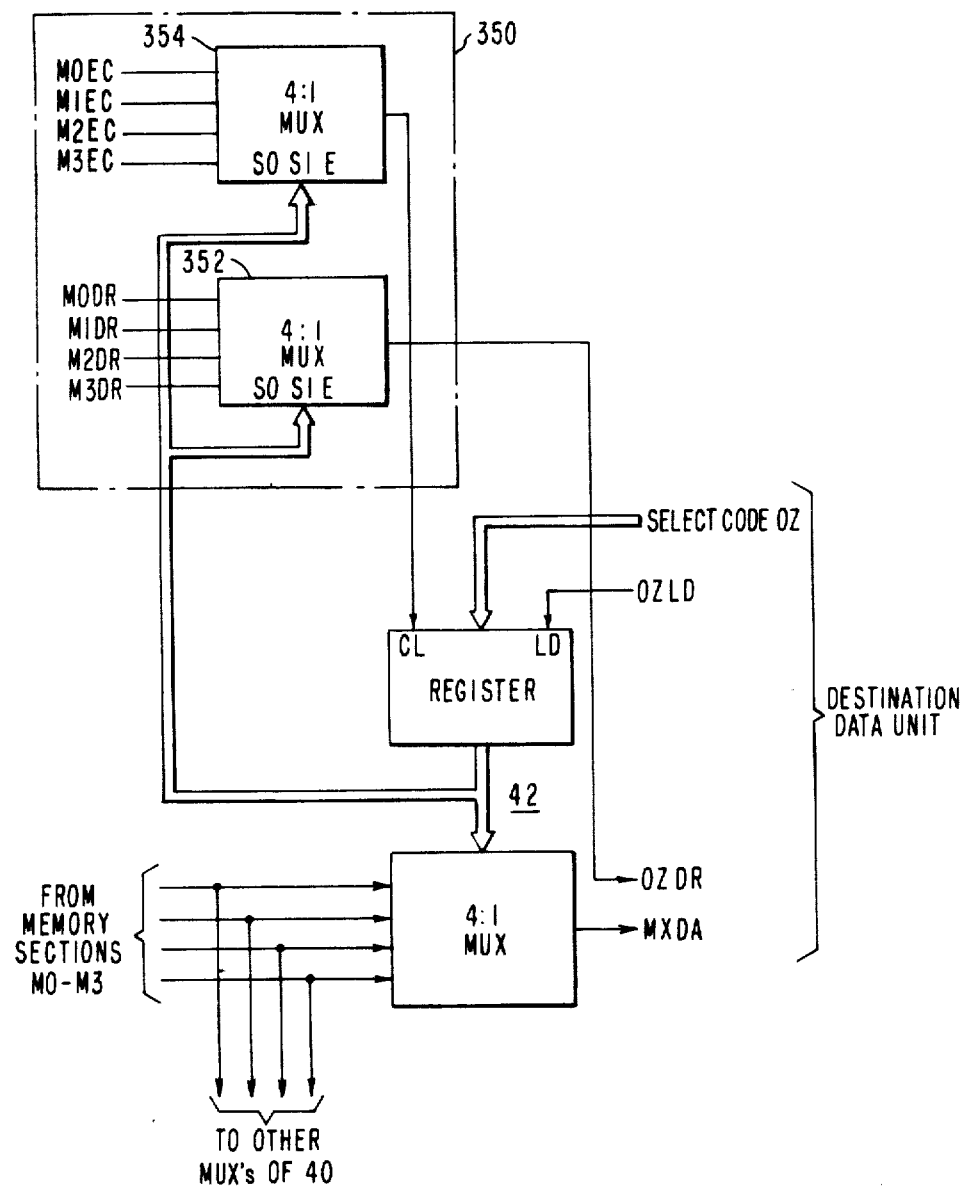
FIG. 9 is a block diagram circuit schematic of an alternate embodiment for an output data ready logic circuit suitable for use in the embodiment of FIG. 1.

An alternate embodiment for the output data ready logic circuit 48 is depicted in FIG. 9. In this embodiment, a destination data handling unit z may generate a select code Oz and loading signal OzLD for selecting the memory section x from which it desires to access digital data. The embodiment depicted in FIG. 9 further includes one of the data word multiplexers 42, for example, of the memory select circuit 40 to illustrate the interaction between the memory select circuit 40 and the alternate embodiment of the output data ready logic circuit shown partially within the dashed lines 350. It is understood that the memory select circuit 40 generally includes as many data word multiplexers, like that shown at 42, for example, for as many destination data handling units coupled to the programmable memory (see the embodiment of FIG. 1). It is further noted that the circuitry shown within the dashed lines 350 may be duplicated for each of the data word multiplexers 42 in the memory select circuit 40.

With this in mind then, the destination unit z supplies the register R of the data word multiplexer 42 with a select code Oz and a register loading signal OzLD. The select code Oz governs the multiplexer 42 to couple the output of the desired memory section x to the destination unit z. The output data ready logic circuit shown partially within the dashed lines 350 determines when to permit the data transfer therebetween to occur. A set of memory data ready signals MxDR is provided to one digital data word multiplexer circuit 352 and a set of memory end cycle logical signals MxEC is provided to the inputs of another digital data word multiplexer circuit 354. The outputs of the register R are coupled to the enable and address inputs of the multiplexers 352 and 354. The output of the multiplexer 352 is representative of the output data ready signal OzDR and is supplied to the destination unit z. In addition, the output of the multiplexer 354 is supplied to the clear input of the register R.

In operation then, a select code Oz and loading signal OzLD are supplied to the register R from the destination unit z for coupling the output of the memory section x to the data handling unit z via the multiplexer 42. Concurrently, the enable and select signals are also provided to the inputs of the multiplexers 352 and 354, which respond by selecting the data ready and end cycle signal lines associated with the designated memory section. If the memory section x is ready to transfer data words, then the signal OzDR will indicate this condition to the destination unit z and the memory address generator x will be triggered to begin its address sequence to transfer data from the memory x to the data handling unit z. At the end of the address sequencing cycle, the end of cycle signal will be generated and clear the register R via the connection through the multiplexer 354. The multiplexers 42, 352 and 354 under this condition are disabled and await a new instruction.

Figure 10:
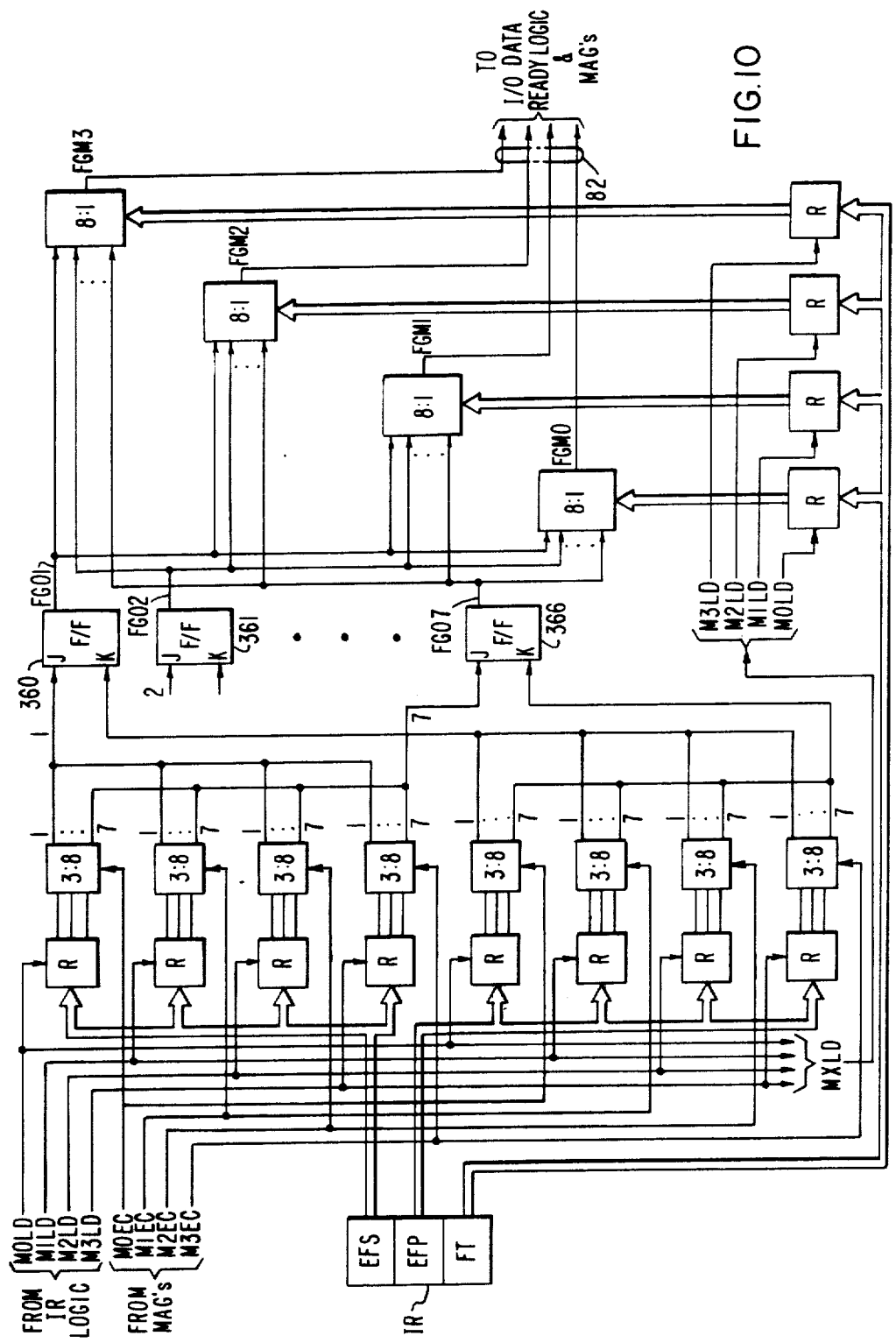
FIG. 10 is a block diagram circuit schematic of a flag logic circuit embodiment suitable for use in the programmable memory depicted in FIG. 1.
Figure 11:
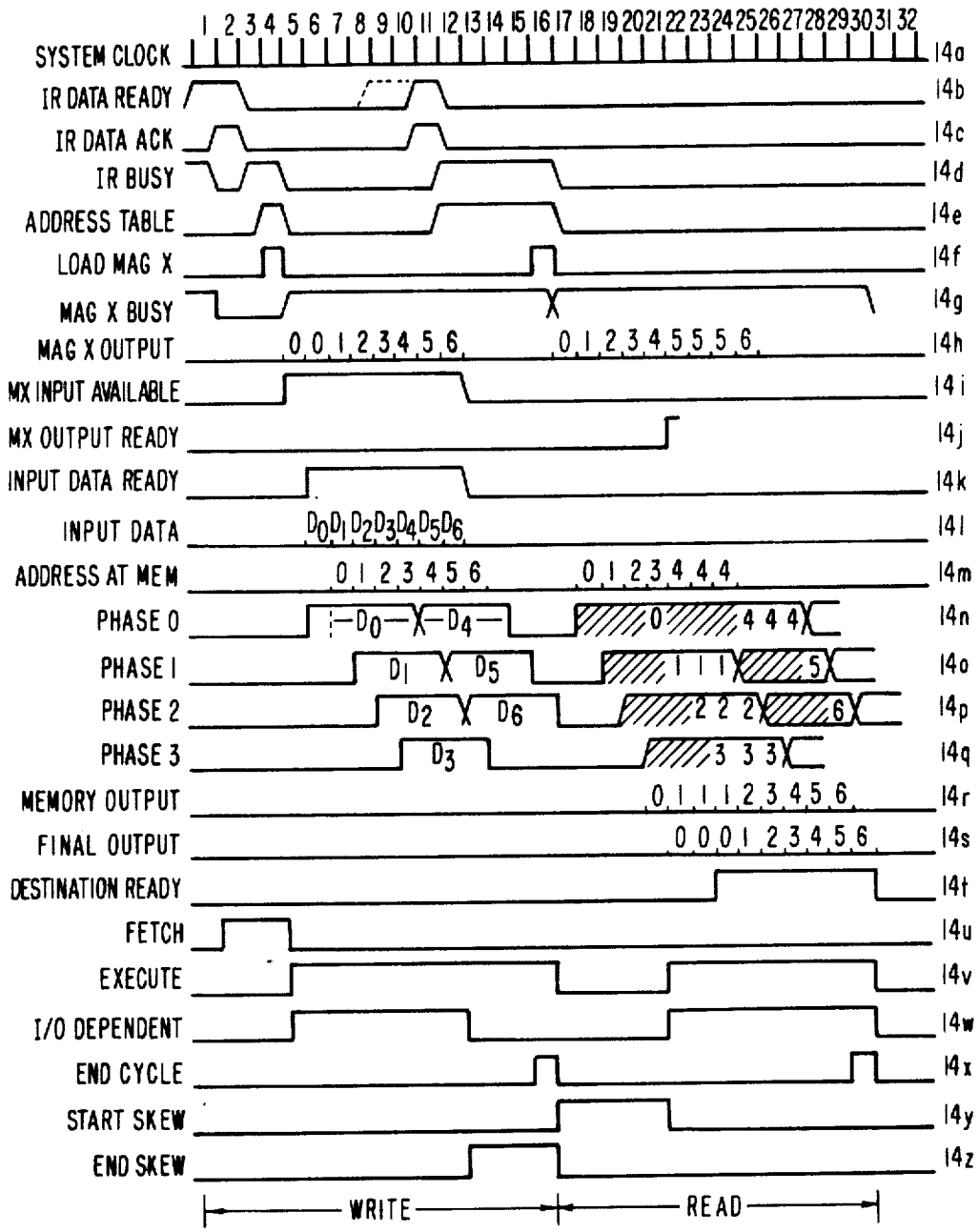
FIG. 11 consisting of timing waveforms 14a–14z illustrates a simple example of operation of the programmable memory embodiment of FIG. 1 illustrating the synchronized operation of the various operational blocks included therein.

The final of the operational units depicted in the embodiment of FIG. 1 is the flag logic circuit 76 and a suitable embodiment thereof is depicted in FIG. 10. The flag logic circuit 76 provides the capability to the programmable memory to make the execution of one memory instruction dependent on the completion of a previous instruction. The programmable memory instruction format, as depicted in FIGS. 6A and 6B, provide three command fields, FT, EFS, EFR associated with controlling the flag flip-flops as shown in the embodiment of FIG. 10 and which will be described in greater detail herebelow. For a further description of the aforementioned command fields, reference is made to Table IV which includes the definitions of all of the fields contained in the programmable memory instruction format.

Referring to FIG. 10, the flag logic circuit embodiment includes seven flip-flops 360–366 and a number of holding registers for each of the three command fields generally commensurate with the number of partitioned memory subsections. For the present example, since there are four memory subsections in the embodiment of FIG. 1, then it follows that there are four holding registers for each of the command fields for flag control. A set of memory loading signals MxLD is provided to the flag logic circuit with one of the loading signals coupled to a corresponding holding register R in each of the register groups. Each holding register R of the groups corresponding to the EFS and EFP command signals has its outputs coupled to the inputs of an 3-to-8 bit multiplexer circuit having outputs enumerated from 0 to 7. Similarly, each of the holding registers R associated with the FT command signal has its outputs coupled to the address inputs of an 8-to-1 bit multiplexer. Each of the zero outputs of the 3-to-8 multiplexer circuits are left unconnected in the present embodiment. But, the remaining outputs 1–7 thereof are OR coupled respectively together. That is, all of the 1 outputs are OR coupled together, the 2 outputs are OR coupled together, and so on. The 1–7 OR couplings are then coupled to the J inputs of the flip-flops 360–366, respectively. Accordingly, the outputs of the 3-to-8 multiplexer circuits associated with the EFP field are similarly arranged except that the OR connections 1–7 are coupled to the K inputs of the flip-flops 360–366, respectively. Each of the outputs FG01, FG02, . . . FG07 of the flip-flops 360–366 are coupled to a corresponding data input of all of the 8-to-1 bit multiplexer circuits. The outputs of the from 8-to-1 multiplexer circuits are representative of the memory flags FGM0–FGM3 which are supplied to the I/O data ready logic circuits 34 and 48 and the MAG's utilizing the signal lines 82 as shown in the embodiment of FIG. 1.

For an example of operation of the flag logic embodiment, it may be assumed that the programmable memory instruction in the instruction register 60 includes a value of 4 in the EFS field, a value of 7 in the EFR field and a value of 3 in the Mx field of the sequence code. Under these conditions as the instruction is executed, the M3LD logical signal causes the loading of the appropriate holding registers of the EFS and EFP fields to be loaded with the values of 4 and 7, respectively. As the MAG completes the execution of the present instruction, the M3EC logical signal will enable the appropriate 3-to-8 multiplexer circuit in each of the EFS and EFP groupings which causes the flag output signal FG04 of the flip-flop 362 (not shown) to be set and the flag output FG07 of the flip-flop 366 to be reset. It is understood that if two instructions were to end simultaneously, then two flags of the grouping may be set and two flags of the grouping may be reset. Note that for the present embodiment, a zero value in the EFS and EFR fields causes no change in the flag status.

Now if the FT field in the previous example contain a value of 2, for example, then the present instruction would be dependent on the state of flag FG02 from the flip-flop 361. The logical signal M3LD loads the value 2 in the appropriate register associated with the FT field. For the embodiment as shown, the value 2 addresses the 8-to-1 multiplexer associated with the memory flag FGM3. For FGM3 to be set, the flag FG02 would have had to have been previously set by one of the prior instructions. Referring back to the embodiment of the memory address generator described in connection with FIG. 7, it is shown that the flag FGMx may be required as a permissive to begin memory address sequence generation. This flag permissive dependence has also been described in connection with the embodiments of the input and output data ready logic circuits of FIGS. 8A and 8B.

A simple example of operation of the programmable memory embodiment as described in connection with FIG. 1 illustrating the synchronized operation of the various circuits included therein with the system clock is depicted in the waveforms 14a through 14z of FIG. 14. The signals associated with the waveforms 14a through 14z are identified at the left index of the diagram. Most of the timing signals have been described in connection with the particular embodiments of the operating units of the programmable memory. A few of the timing signals like the address table, fetch and execute, for example, may not have been. The address table timing signal waveform 14e may be an indication that the instruction information is available at the output of the memories 188 and 192 included in the associated logic circuit embodiment of FIG. 6. The fetch and execute timing signals of waveforms 14u and 14v, respectively, may be indications that a new instruction is being fetched for storage in the next instruction register 60 and accordingly the instruction in register 60 is being executed by a memory address generator. In addition, the I/O dependent timing signal, waveform 14w, may be an indication that a memory section x is either available for storage of digital words or ready to output digital words awaiting the selection of an external data handling unit.

The timing waveform example of FIG. 14 is broken up into a write operation and a read operation. The read operation is shown to immediately follow the write operation in time merely for the convenience of describing the overall combination of operations. It is understood that the read operation may occur any time subsequent the write operation. The programmable instruction associated with the write operation directs the programmable memory to store the data words denoted as D0 through D6 from a source data handling unit to a designated memory section x. The programmable instruction associated with the read operation directs the memory section x to output the data words D0 through D6 to a selected destination data handling unit. According to the present example, the write operation is accomplished over the first sixteen clock pulses 1–16 of the system clock and the read operation occurs over the next 15 system clock pulses 17–30.

As shown by the waveforms 14b and 14c, an instruction is indicated as being ready for transfer at clock pulse 1 and thereafter transferred to the instruction register at clock pulse 2. According to waveform 14d the instruction register is indicated as being busy at clock pulse 2. The instruction information is indicated as being available at the outputs of the memories 188 and 192 at clock pulse 4 and thereafter, the programmable instruction is loaded into the designated MAGx at clock pulse 4 as shown by the waveforms 14e and 14f. The MAGx becomes busy thereafter at clock pulse 5 as indicated by the waveform 14g and currently the memory input available signal is generated in waveform 14i.

The MAGx begins its address sequence as the input data ready signal of waveform 14k is generated. The delay in the addressing sequences between waveforms 14h and 14m may be due to a storage register included between the MAGx and Mx. The sequencing of the memory subsections or phases is shown in waveforms 14n through 14q. Note that at the end of the addressing sequence of waveform 14m the end skew signal of waveform 14z is generated for four system clock pulses 13 through 16. The last system clock pulse for the write operation is clock pulse 16 and during this time, the end cycle signal is generated as indicated by waveform 14x. It may be pointed out at this time that after the data words D0 through D6 have been sequenced into the memory section x, the input data ready signal of waveform 14k is terminated.

Also during the write operation, another instruction is stored in the next instruction register 60 at clock pulse 11 as shown by the waveforms 14b through 14d. The next instruction is maintained in the register 60 until the MAGx is no longer busy, the indication of which being the end cycle signal of waveform 14x at clock pulse 16. Simultaneously with this end cycle signal, the next instruction is loaded into the designated MAG which again becomes busy as indicated by the waveforms 14f and 14g. Note that with a read operation, the start skew timing signal of waveform 14y limits the time multiplex readout of the memory subsections or phases of the designated memory section x. This is observed in the timing example through inspection of the waveforms 14n through 14s during the clock pulses 17 through 21. Note that no data words may be accessed from the memory sections x until the destination ready signal is generated as indicated by the waveform 14t. During the time periods 24 through 30, when the destination ready signal is positive, the memory subsections are time multiplexed to provide the data word D0 through D6 to the designated destination handling unit. Here again, at the last clock cycle 30 of the read operation, the end cycle signal becomes positive indicating the end of the address sequencing as illustrated by waveform 14x. While the instant example described hereabove is a simple one, it is believed sufficient to understand the operations and interactions of the various circuit blocks of the programmable memory. Furthermore, any extension of this operation to a more complex example is felt possible without an undue effort given the description of the operational units of the programmable memory provided hereabove.

Figure 12:
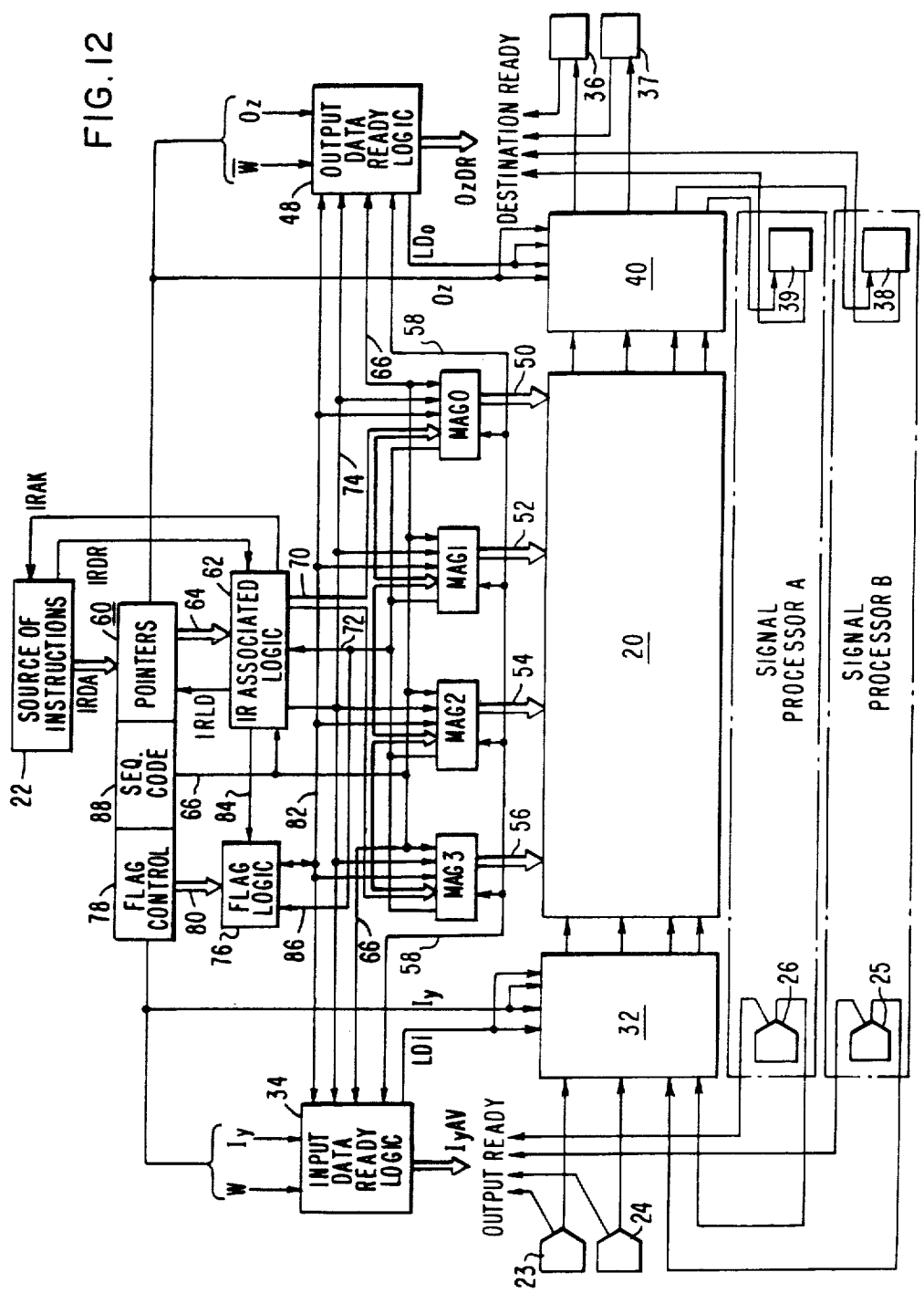
FIG. 12 is a block diagram schematic of a signal processing system suitable for embodying another aspect of the present invention.

As has been discussed hereinabove in connection with the embodiment of FIG. 1, it may be possible that one or more of the combinations of source and destination handling units be included in a common data handling apparatus such as a signal processor, for example. Such a digital signal processing system is depicted in the block diagram schematic embodiment as shown in FIG. 12. The signal processors A and B for example, may be of the type described in the U.S. Pat. No. 3,812,470 issued May 21, 1974 to John C. Murtha et al., entitled "Programmable Digital Signal Processor", and assigned to the same assignee as the instant application. In the example shown in FIG. 12, the source 26 and destination 38 data handling units are included in the signal processor A and likewise, the source 25 and destination 37 data handling units are included in the signal processor B. In each case, the source and destination data handling units may have common apparatus associated therewith for performing the inputting and outputting data word operations to and from their respective signal processor. Moreover, the inputting and outputting of data words to the signal processors may be accomplished utilizing the programmable memory as if the source and destination data handling units associated therewith were individual entities.

In the present example of FIG. 12 the source of instructions 22 may be the actual signal processors A and B themselves in which case the programmable memory is controlled under the sequence of instructions output from signal processor A or signal processor B or a combination thereof. Because the signal processors A and B have full control over the processing operations thereof, they are in a position to know when additional vectors or blocks of additional words are to be read in from the external source data handling units such as 23 and 24 and known when to output processed vectors of data words to destination data handling units 36 and 37, for example, for post-processing, recording or display purposes, for example.

While the digital signal processing system of FIG. 12 and more particularly the programmable memory embodiment of FIG. 1 have been described in connection with a partitioned memory of four memory sections and subsections, it is evident that the present invention should not be limited to any embodiment having a specific number of partitioned memory sections and subsections, but rather should be allowed to extend to a more general embodiment such as that shown in FIG. 13.

Figure 13:
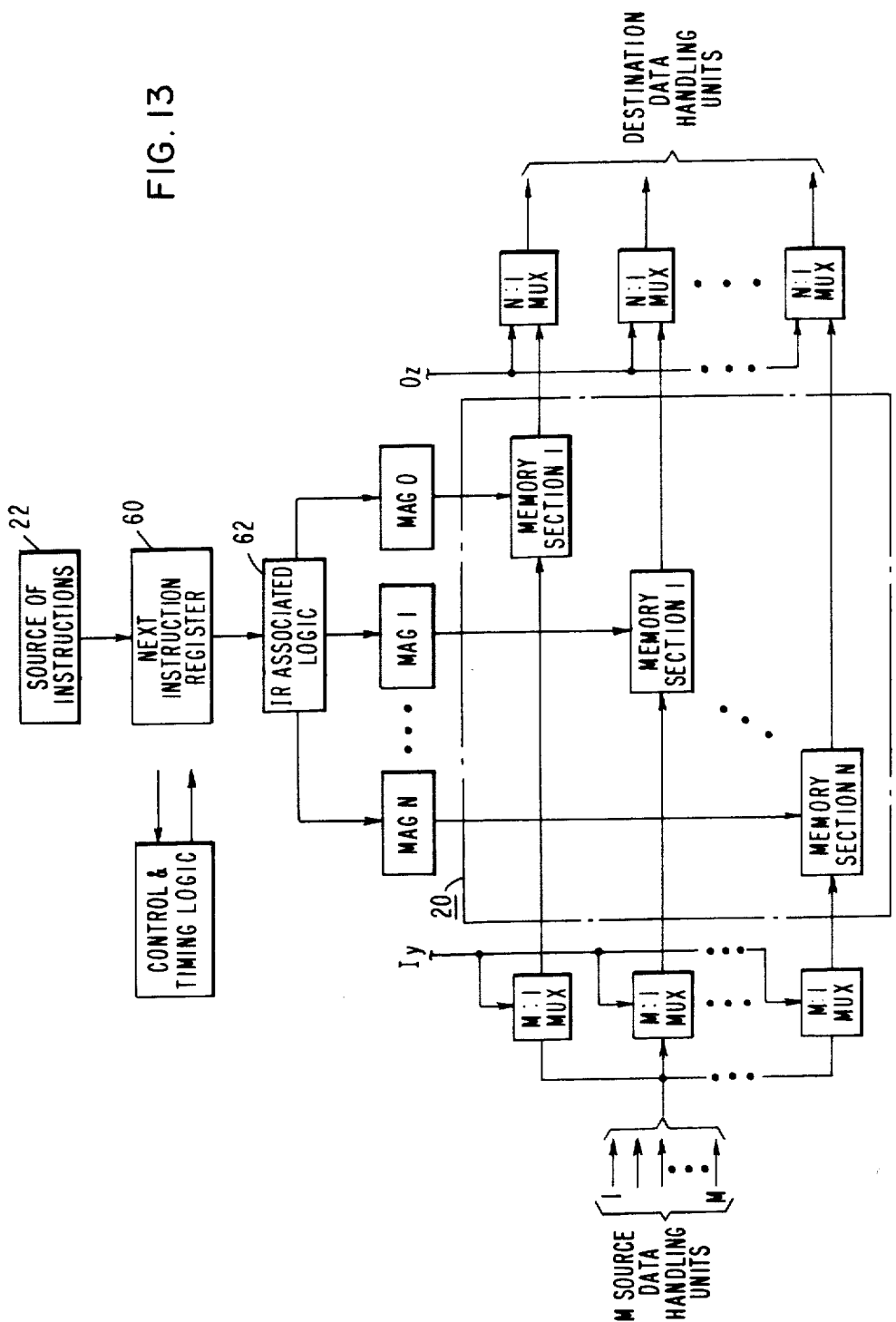
FIG. 13 is a block diagram schematic of a programmable memory embodiment encompassing N memory sections.

FIG. 13 depicts the programmable memory in a more general sense including a plurality of N partitioned memory sections for the bulk memory 20. In this case, the input select circuit may comprise an M to 1 multiplexer circuit for each partitioned memory section, assuming that M source data units are coupled correspondingly to each multiplexer of the input select circuit. Likewise, in the output select circuit, there may be included a N to 1 multiplexer for each destination unit wherein each partitioned memory section is coupled to the inputs thereof. A memory address generator is coupled to each memory section and enumerated correspondingly as MAG1 through MAGN. The instructions are provided to the memory address generators 1 through N with a similar circuit arrangement as that of the embodiment depicted in FIG. 1 where the instructions are provided from a source 22 to the next instruction register 60, to the associated logic circuit 62 and distributed then to the designated memory address generator. A control and timing logic circuit block shown in the embodiment of FIG. 13 may include such things as the flag logic, input/output data ready logic, system clock and other synchronizing signals. The control and timing logic circuit interacts with the instruction register 60, associated logic circuit 62, memory address generators 1 through N and the input and output select circuits including the governing of the multiplexer circuits included therein. The operation of this more generalized embodiment may be similar to that described in connection with the embodiment of FIG. 1.

In summary then, the digital signal processing system and more especially the programmable memory thereof provides a direct interface between source and destination data handling units even in the case where combinations thereof are included in the same data handling unit such as a signal processor, for example. The embodiment used for the purposes of describing the present invention provides the following features:

(1) Provides for a rate change between external data handling units, such as an A/D converter, and a high-speed signal processor without the use of an intermediate buffer memory in each case;

(2) Allows for barrel memory operation, where a partition subsection of the memory is used to collect and store data while another subsection of the memory may be used to also store data, interact with a signal processor or transfer data to one or more external destination handing units, for example;

(3) The program address sequences generated by the memory address generators may permit variable block sizes of data words to be collected and stored in or accessed and output from selected memory sections of the bulk memory;

(4) Multiple blocks or vectors of digital data words may be either accessed or stored from or to one or more of the partitioned subsections of the bulk memory by one instruction;

(5) Blocks of digital data words may be accessed or stored in the partitioned memory sections using a corner turn data set sequence as governed by a programmed memory address generator;

(6) The time multiplexed memory subsection features permit slower, high-density memory elements to be utilized while maintaining a high throughput rate for the bulk memory;

(7) The programmable memory embodiment may be operative as an additional working memory for at least one signal processor by allowing direct to/from data word interaction with the signal processor at the high speed signal processors throughput rate;

(8) The programmable memory provides bulk storage for the signal processor's large data files; and (9) The source of instructions which program the programmable memory embodiment may be developed in an instruction controller within the programmable memory or be provided under the direction of one or more signal processors interfaced therewith.

TABLE IA

APPENDIX
Description and Definition of Major Timing Signals
*Refer to Key at end of Table IA for
Prefix and Suffix Definitions

| Signal Name | No. | Description |
|---|---|---|
| Next Instruction Register Logic | | |
| IRDA: | | Instruction Register Data whose contents indicate the input/output command for the Programmable Interface Memory, PIM. IRDA may be issued by the signal processor's program. |
| IRDR: | | Instruction Register Data Ready signal that provides the indication that new IRDA is available for the PIM. This signal may be issued by the signal processor's program. |
| IRAK: | 1. | Instruction Register Data Acknowledge signal indicates that the PIM has accepted the new IRDA. This signal issued by the PIM, is an indication the PIM instruction has been issued. |
| | | IRAK = (IRDR) ($\overline{\text{IRBY}}$) |
| IRLD: | 2. | Instruction Register Load signal enables the instruction register to be loaded with IRDA. This signal is logically equivalent to IRDA. IRLD = IRAK |
| IRBY: | | Instruction Register Busy flip flop indicates that the PIM has received an instruction but has not executed it. |

TABLE IA-continued
APPENDIX
Description and Definition of Major Timing Signals
*Refer to Key at end of Table IA for Prefix and Suffix Definitions

| | | |
|---|---|---|
| JIRBY: | 3. | Set Instruction Register Busy signal enables the IRBY flip flop to be set to a "1". JIRBY = IRAK |
| KIRBY: | 4. | Reset Instruction Register Busy signal enables the IRBY flip flop to be reset. KIRBY = MxLD |
| MxLD: | 5. | Memory x Load pulse starts the execution of PIM instruction for Memory x. MxLD = [$\overline{MxBY}$ = (MxBY)(MxEC)] [(IRBY)(IDx)(TDAV)] |
| MxBY: | | Memory x Busy flip flop indicates that memory x is executing a PIM instruction. |
| JMxBY: | 6. | Set Memory x Busy flip flop signal enables MxBY flip flop to be set to a "1". JMxBY = MxLD |
| KMxBY: | 7. | Reset Memory x Busy flip flop signal enables the MxBY flip flop to a "0". |

Memory Address Generator Skew Signals

| | | |
|---|---|---|
| MxSS: | | Memory x Start Skew flip flop. |
| JMxSS: | 8. | Set Memory x Start Skew signal enables the MxSS flip flop to be set to a "1". JMxSS = (MxLD)($\overline{MxWR}$) |
| KMxSS | 9. | Reset Memory x Start Skew signal enables the MxSS flip flop to be reset to "0". KMxSS = SSEC |
| SSEC: | 10. | Start Skew End Cycle signal indicates last clock cycle of the start skew. SSEC = <SSC> = 5 |
| MxES: | | Memory x End Skew flip flop. |
| JMxES: | 11. | Set Memory x End Skew signal enables the MxES flip flop to be set to a "1". JMxES = BCxEC |
| KMxES: | 12. | Reset Memory x End Skew signal that enables the MxES flip flop to be reset to a "0". KMxES = |
| ESEC: | 13. | End Skew End Cycle signal indicates the last clock cycle of the end skew. ESEC = <ESC> = 4 |
| MxDR: | 14.A | Memory x Data Ready signal indicates that memory section x has data at its output. MxDR = (FGyy)(MxBY)($\overline{MxWR}$)($\overline{MxSS}$) ($\overline{MxST}$) |
| OzDR: | 14.B | Output z Data Ready signal indicates that the PIM has data at its output for destination z. OzDR = (MxDR)(FGMx)(<Oz> = z) |
| MxAV: | 15.A | Memory x Available signal indicates that the memory x section of the PIN is ready to receive data. MxAV = (FGMx)(MxBY)(MxWR) ($\overline{MxES}$)($\overline{MxST}$) |
| IyAV: | 15.B | Input y Available signal indicates that Input y is available to receive data. IyAV = (MxDR)(FGMx)(<Iy> = y) |
| MxME: | 16. | Memory x Master Enable signal indicates valid clock cycles to the MAG. MxMe = (MxBY)($\overline{MxWR}$)($\overline{MxST}$) [(OzDr)(FGMx)($\overline{MxSS}$) + MxSS] + (MxBY)(MxWR)($\overline{MxST}$) [(IyDr)(FGMx)($\overline{MxES}$) + MxES] |

Memory Address Generator

| | | |
|---|---|---|
| PCxLD: | 17. | Phase Counter x Load signal identifies the clock cycle to initialize the PC to its first value. PCxLD = MxLD |
| PCxADV: | 18. | Phase Counter x Advance signal defines the clock cycles on which the phase counter will advance. PCxADV = MxME + (MxBY)(STx) |
| PCxUP: | 19. | Phase Counter x Up signal defines when the phase counter will advance in a straight sequence. The complement of this signal indicates when the PC counter will be advanced in the reverse sequence. PCxUP = ($\overline{MxCT}$)(LWS1 + LWS2) |
| WCxLD: | 20. | Word Counter x Load signal identifies the clock cycle to initialize the WC to its first value for a vector readout. WCxLD = MxLD + (MxME) [(SBxEC)($\overline{CT}$) + (0)(CT)] |
| WCxADV: | 21. | Word Counter x Advance signal defines the clock cycles on which the WC will advance. WCxADV = (MxME) [($\overline{CT}$) + (CT)(BCxEC)] |
| WCxEC: | 22. | Word Counter x End Cycle signal indicates the last state of the word counter. WCxEC = <WC> = 3 |
| WCxLW: | 23. | Word Counter x Last Word signal indicates the last word of a data vector. WCxLW = (SCxLS)(<WC> = <LW Field>) |
| SCxLS: | 24. | Subblock Counter x Last Subblock signal indicates the last subblock of a sequence. SCxLS = <SC> = <LS Field> |
| SCxLD: | 25. | Subblock x Load signal identifies the clock cycle to initialize the SC to its initial value for a data sequence. SCxLD = MxLD + (MxME) [(SBxEC)($\overline{CT}$) + (0)(CT)] |
| SCxADV: | 26. | Subblock x Advance signal defines the clock cycles on which the SC will advance. SCxADV = (MxME)(WCxEC) [$\overline{CT}$ + (CT)(BCxEC)] |
| SCxEC: | 27. | Subblock x End Cycle signal identifies the last clock cycle of a data vector in the straight sequence and the last clock cycle of a data set in the corner turn sequence. SCxEC = (WCxLW) [$\overline{CT}$ + (CT)(BCxEC)] |
| BCxLD: | 28. | Block Counter x Load signal identifies the clock cycle on which the BC is initiated to its first value. BCxLD = MxLD + (MxME) [(0)($\overline{CT}$) + (CT)(BCxEC)] |
| BCxADV: | 29. | Block Counter x Advance signal defines the clock cycles on which the BC will advance. BCxADV = (MxME) [(WCxLW)($\overline{CT}$) + ($\overline{BCxEC}$)(CT)] |
| BCxEC: | 30. | Block Counter x End Cycle signal indicates the last clock cycle of the block counter. In the straight count sequence, this signal indicates the last clock cycle of the data set; while, in the corner turn sequence, this signal represents the last clock cycle of each data vector. BCxEC = (WCxLW)(BCxLB)($\overline{CT}$) + (BCxLB)(CT) |
| ST: | | Skip Time flip flop. |
| JMxST: | 31. | Set Memory x Skip Time flip flop signal enables the ST to be set to a "1". JMxST = ($\overline{CT}$)(WCxLW)(x0 + x3) + (CT)(BCxEC) {[(x0 + x3)(y0 + y2 + y3)] + [(x1 + x2)(y0 + y1 + y2)]} |
| KMxST: | 32. | Reset Memory x Skip Time signal enables the ST to be set to a "0". KMxST = STCxEC |
| STCxLD: | 33. | Skip Time Counter x Load signal indicates the clock time to initialize the STC. STCxLD = JMxST |
| STCxADV: | 34. | Skip Time Counter x Advance signal defines |

TABLE IA-continued
APPENDIX
Description and Definition of Major Timing Signals
*Refer to Key at end of Table IA for Prefix and Suffix Definitions

|         |     | the clock cycles on which the STC will advance. STCxADV = MxST |
|---------|-----|-----|
| STCxEC: | 35. | Skip Time Counter x End Cycle signal indicates the last clock cycle in a skip time. STCxEC = <STC> = 3 |
| MxEC:   | 36. | Memory x End Cycle signal indicates the last cycle in a data set. MxEC = (WCxLW)(BCxEC)(CT) |

*Prefix and Suffix Definitions

| Prefix: |                      | Suffix: |                  |
|---------|----------------------|---------|------------------|
| PC:     | Phase Counter        | LD:     | Load             |
| WC:     | Word Counter         | BY:     | Busy             |
| SB:     | Subblock Counter     | DR:     | Data Ready       |
| BC:     | Block Counter        | DA:     | Data             |
| Mx:     | Memory Section x     | AV:     | Available        |
| Ax:     | Address Generator X  | EC:     | End Cycle        |
| Ix:     | Input Source X       | LP:     | Last Phase       |
| Ox:     | Output Destination X | LW:     | Last Word        |
| IR:     | Instruction Register | LS:     | Last Subblock    |
| TD:     | Table Data           | LB:     | Last Block       |
| ES:     | End Skew F/F         | ST:     | Skip Time FF     |
| SS:     | Start Skew F/F       | AK:     | Acknowledge      |
| WR:     | Write = Input        | ME:     | Master Enable    |
| RD:     | Read = Output        | UP:     | Up/Down Control  |
| ESC:    | End Skew Ctr         | ADV:    | Advance          |
| SSC:    | Start Skew Ctr       | where:  | for m = 4        |
| STC:    | Skip Time Ctr        | x:      | 0 ≦ x ≦ 3        |
| FG:     | Flag                 | <>:     | Content of       |
| CLK:    | Throughput Rate      | S1:     | State 1          |
| J:      | Set to 1             | S2:     | State 2          |
| K:      | Set to 0             | WD:     | Word             |
|         |                      | CT:     | Corner Turn      |

We claim:

1. A programmable digital memory operative in response to programmed instructions from a source of instructions to transfer digital data words between itself and at least one data handling unit external thereto, said digital memory comprising:

a bulk memory partitioned into a plurality of memory sections;

a plurality of memory address generators coupled correspondingly to said plurality of memory sections with each memory address generator being operative, simultaneously with and independently of the other memory address generators of said plurality, to control memory address sequencing of its corresponding memory section for the transfer of digital data words, corresponding to said sequenced addresses, between said memory section and a selected data handling unit, and to generate at least one signal representative of the state of operation thereof; and memory control logic circuitry operative in response to said programmed instructions to distribute each programmed instruction to a correspondingly designated memory address generator in accordance with said signals representative of the states of operation thereof for governing the memory address sequencing operations performed thereby.

2. The programmable digital memory in accordance with claim 1 wherein each partitioned memory section comprises a plurality of memory subsections having commonly addressable memory locations for time-multiplexing data word transfer operations; and wherein each memory address generator includes memory address sequencing apparatus for storing selected blocks of digital data words in corresponding blocks of memory locations, comprising a set of commonly addressable memory locations of said memory subsections, in accordance with desired time-multiplexed memory address accessing sequences correspondingly predetermined therefor.

3. The programmable digital memory in accordance with claim 2 wherein each partitioned memory section comprises an array of memory locations with one addressable index of each of said memory locations being the address of the memory subsection thereof and another addressable index of each of said memory locations being the address of the commonly addressable memory location thereof, said array of memory locations being further subdivided into indexed addressable blocks and subblocks of memory locations to facilitate the time-multiplexed block data word transfer operations, said subblocks comprising the commonly addressable memory locations of the plurality of memory subsections.

4. The programmable digital memory in accordance with claim 3 wherein the memory address sequencing apparatus of each memory address generator comprises:

a first logic circuit for generating digital timing signals associated with the time-multiplexed memory addressing operations;

a second logic circuit for generating digital timing signals associated with the memory address sequence set forth in the programmed instruction distributed thereto;

a first counter circuit for generating the address sequence for the memory subsections in connection with the time-multiplexed transfer of the blocks of digital data words as governed by said programmed instruction;

a second counter circuit for counting the number of digital data words being transferred in a transfer operation and for generating a signal indicative of the last word transferred in said transfer operation as governed by said programmed instruction;

a third counter circuit governed by said programmed instruction for generating the memory address sequence for the memory subblocks in connection with a block transfer operation and for generating a signal indicative of the last subblock transferred in said block transfer operation;

a fourth counter circuit governed by said programmed instruction for generating the memory address sequence for the memory blocks in connection with a multiple block transfer operation and for generating a signal indicative of the last block transferred in said multiple block transfer operation; and a third logic circuit for interacting said signals generated by the aforementioned circuits together and with said programmed instruction in accordance with a predetermined logical arrangement to enable and coordinate the operations of said first through fourth counter circuits, said third logic circuit further operative to generate signals indicative of the operational states of the memory address generator.

5. The programmable digital memory in accordance with claim 1 including an input switching circuit selectively operative to couple any memory section of the plurality to any one of a plurality of source data handling units external thereto in accordance with the programmed instructions for collecting and storing digital data words transferred therefrom.

6. The programmed digital memory in accordance with claim 5 wherein the input switching circuit includes means for selectively coupling more than one memory section correspondingly to more than one source data handling unit; and wherein said more than one memory sections being operative under the direction of their memory address generators to simultaneously collect and store digital data words from the source data handling units correspondingly coupled thereto.

7. The programmed digital memory in accordance with claim 5 including an input data ready logic circuit governed by the signals representative of the states of operation of the plurality of memory address generators and the programmed instructions to generate input permissive signals, each indicating that a selected memory section is available to collect and store digital words from the chosen source data handling unit correspondingly coupled thereto by the input switching circuit.

8. The programmed digital memory in accordance with claim 1 including an output switching circuit selectively operative to couple any memory section of the plurality to any of one of a plurality of destination data handling units in accordance with the programmed instructions for accessing and transferring digital data words thereto.

9. The programmed digital memory in accordance with claim 8 wherein the output switching circuit includes means for selectively coupling more than one memory section correspondingly to more than one destination data handling unit; and wherein said more than one memory sections being operative under the direction of their memory address generators to simultaneously access and transfer digital data words to the destination data handling units correspondingly coupled thereto.

10. The programmed digital memory in accordance with claim 8 including an output data ready logic circuit governed by the signals representative of the states of operation of the plurality of memory address generators and the programmed instructions to generate output permissive signals, each indicating that a selected memory section is ready to access and transfer digital data words to the chosen destination data handling unit correspondingly coupled thereto by the output switching circuit.

11. The programmed digital memory in accordance with claim 1 including an output switching circuit governed by a select code generated by at least one of a plurality of destination data handling units for selecting an appropriate memory section for said destination data handling unit; and an output data ready logic circuit governed by signals representative of the states of operation of the plurality of memory address generators to generate permissive signals permitting the transfer of data words between said destination data handling unit and its selected memory section.

12. The programmed digital memory in accordance with claim 1 including an input switching circuit selectively operative to couple one memory section of the plurality to any one of a plurality of source data handling units, and an output switching circuit selectively operative to couple another memory section of the plurality to any one of a plurality of destination data handling units, both operations performed in accordance with the programmed instructions; and wherein said one and another memory sections being operative under the direction of their corresponding memory address generators to store data words from the chosen source data handling unit in said one memory section and access data word for the chosen destination data handling unit from said other memory section, simultaneously.

13. The programmed digital memory in accordance with claims 7, 10 or 11 including a flag logic circuit for generating flag signals as governed by the programmed instructions and signals representative of the states of operation of the plurality of memory address generators, said flag signals being used logically to further govern the generation of the permissive signals which permit a transfer of data words between selected memory sections and the source and destination data handling units correspondingly coupled thereto.

14. A programmed digital memory in accordance with claim 13 wherein each memory address generator includes memory address sequencing apparatus for transferring digital data words between its corresponding memory section and a selected one of the source and destination data handling units as conditionally governed by the permissive signals generated by the input and output data ready logic circuits and the flag signals generated by the flag logic circuit.

15. A digital signal processing system governed by programmed instructions from a source of instructions, said system comprising:
- at least one signal processor having an input section for accepting digital words for processing and an output section for transferring processed digital words therefrom;
- at least one source of digital data words for processing by said signal processor;
- at least one destination unit for accepting processed digital words; and
- a bulk digital memory operative in response to programmed instructions from said source of instructions to transfer digital data words between itself and said source of digital data words, said destination unit and said signal processor, said bulk digital memory comprising:
  - a plurality of memory sections;
  - a plurality of memory address generators coupled correspondingly to said plurality of memory sections with each memory address generator being operative, simultaneously with and independently of the other memory address generators of said plurality, to control memory address sequencing of its corresponding memory section for the transfer of digital data words, corresponding to said sequenced addresses, between said memory section and a selected one of said source of digital data words, said destination unit, and said signal processor and to generate at least one signal representative of the state of operation thereof; and
  - memory control logic circuitry operative in response to said programmed instructions to distribute each programmed instruction to a correspondingly designated memory address generator in accordance with said signals representative of the states of operation thereof for governing the memory address sequencing operations performed thereby.

16. The digital signal processing system in accordance with claim 15 wherein each memory section of said bulk memory comprises a plurality of memory subsections having commonly addressable memory locations for time-multiplexing data word transfer operations; and wherein each memory address generator includes memory address sequencing apparatus for storing selected blocks of digital data words in corresponding blocks of memory locations, comprising a set of commonly addressable memory locations of said memory subsections, in accordance with desired time-multiplexed memory address accessing sequences correspondingly predetermined therefor.

17. The digital signal processing system in accordance with claim 16 wherein each memory section of said bulk memory comprises an array of memory locations with one addressable index of each of said memory locations being the address of the memory subsection thereof and another addressable index of each of said memory locations being the address of the commonly addressable memory location thereof, said array of memory locations being further subdivided into indexed addressable blocks and subblocks of memory locations to facilitate the time-multiplexed block data word transfer operations, said subblocks comprising the commonly addressable memory locations of the plurality of memory subsections.

18. The digital signal processing system in accordance with claim 17 wherein the memory address sequencing apparatus of each memory address generator of the bulk memory comprises:
 a first logic circuit for generating digital timing signals associated with the time-multiplexed memory addressing operations;
 a second logic circuit for generating digital timing signals associated with the memory address sequence set forth in the programmed instruction distributed thereto;
 a first counter circuit for generating the address sequence for the memory subsections in connection with the time-multiplexed transfer of the blocks of digital data words as governed by said programmed instruction;
 a second counter circuit for counting the number of digital data words being transferred in a transfer operation and for generating a signal indicative of the last word transferred in said transfer operation as governed by said programmed instruction;
 a third counter circuit governed by said programmed instruction for generating the memory address sequence for the memory subblocks in connection with a block transfer operation and for generating a signal indicative of the last subblock transferred in said block transfer operation;
 a fourth counter circuit governed by said programmed instruction for generating the memory address sequence for the memory blocks in connection with a multiple block transfer operation and for generating a signal indicative of the last block transferred in said multiple block transfer operation; and
 a third logic circuit for interacting said signals generated by the aforementioned circuits together and with said programmed instruction in accordance with a predetermined logical arrangement to enable and coordinate the operations of said first through fourth counter circuits, said third logic circuit further operative to generate signals indicative of the operational states of the memory address generator.

19. The digital signal processing system in accordance with claim 15 including an input switching circuit selectively operative to couple any memory section of the plurality to any one of the units selected from the group of digital data word sources and signal processor in accordance with the programmed instructions for collecting and storing digital data words transferred therefrom.

20. The digital signal processing system in accordance with claim 19 wherein the input switching circuit includes means for selectively coupling more than one memory section correspondingly to more than one unit selected from the group of digital data word sources and signal processors; and wherein said more than one memory sections being operative under the direction of their memory address generators to simultaneously collect and store digital data words from the selected units correspondingly coupled thereto.

21. The digital signal processing system in accordance with claim 19 including an input data ready logic circuit governed by the signals representative of the states of operation of the plurality of memory address generators and the programmed instructions to generate input permissive signals, each indicating that a selected memory section of the bulk memory is available to collect and store digital words from the selected unit correspondingly coupled thereto by the input switching circuit.

22. The digital signal processing system in accordance with claim 15 including an output switching circuit selectively operative to couple any memory section of the plurality to any one of the units selected from the group of destination units and signal processor in accordance with the programmed instructions for accessing and transferring digital data words thereto.

23. The digital signal processing system in accordance with claim 22 wherein the output switching circuit includes means for selectively coupling more than one memory section correspondingly to more than one unit selected from the group of destination units and signal processor; and wherein said more than one memory sections being operative under the direction of their memory address generators to simultaneously access and transfer digital data words to the units correspondingly coupled thereto.

24. The digital signal processing system in accordance with claim 22 including an output data ready logic circuit governed by the signals representative of the states of operation of the plurality of memory address generators and the programmed instructions to generate output permissive signals, each indicating that a selected memory section is ready to access and transfer digital data words to the selected unit correspondingly coupled thereto by the output switching circuit.

25. The digital signal processing system in accordance with claim 15 including an output switching circuit governed by a select code generated by at least one unit of the group of destination units and signal processor for selecting an appropriate memory section for said unit; and an output data ready logic circuit governed by signals representative of the states of operation of the plurality of memory address generators to generate permissive signals permitting the transfer of data words between said unit and its selected memory section.

26. The digital signal processing system in accordance with claim 15 including an input switching circuit selectively operative to couple one memory section of the plurality to any one unit selected from the group of digital data word sources and signal processor, and an output switching circuit selectively operative to couple another memory section of the plurality to any other unit selected from the group of destination units and signal processor, both operations performed in accordance with the programmed instructions; and wherein said one and another memory sections being operative under the direction of their corresponding memory address generators to collect data words from said one selected unit in said one memory section and access data word for said other selected unit from said other memory section, simultaneously.

27. The digital signal processing system in accordance with claims 21, 24 or 25 including a flag logic circuit for generating flag signals as governed by the programmed instructions and signals representative of the states of operation of the plurality of memory address generators, said flag signals being used logically to further govern the generation of the permissive signals which permit a transfer of data words between selected memory sections and the selected units correspondingly coupled thereto.

28. A digital signal processing system in accordance with claim 27 wherein each memory address generator includes memory address sequencing apparatus for transferring digital data words between its corresponding memory section and the selected unit coupled thereto as conditionally governed by the permissive signals generated by the input and output data ready logic circuits and the flag signals generated by the flag logic circuit.

29. A method of addressing a section of addressable memory locations for accessing therefrom and storing therein blocks of data words in accordance with predetermined sequences, said memory section being divided into subblocks each having a predetermined number of memory locations m, said method comprising the steps of:
- deriving a value $x_i$ associated with a corresponding block of data words i based on the number of data words of the block i, the predetermined number of memory locations m in a subblock, and the minimum number of subblocks $n_i$ capable of storing the data words of the block i;
- addressing the memory locations of said memory section for a plurality of blocks of data words in accordance with a straight sequence by sequencing all of the addressable memory locations of one subblock from a predetermined initial memory location prior to advancing to sequence another subblock of said memory section, and skipping over memory location addresses during said memory section address sequencing between successive blocks of data words in accordance with said derived values $x_i$; and
- addressing the memory locations of said memory section for a plurality of blocks of data words in accordance with a corner turn sequence by sequencing traversely the memory location addresses of the subblocks in one of either a straight or reverse sequential order based on the derived value $x_i$ associated with said blocks of data words, and skipping over memory location addresses during said memory section address sequencing between successive blocks of data words based on the modulo m value of the number of blocks in said plurality and the $x_i$ value of the data word blocks thereof.

30. The method in accordance with claim 29 wherein the value $x_i$ is derived in accordance with the following expression:

$$X_i = N - mn_i$$

where
N = number of data words in block i,
m = predetermined number of memory locations in a subblock, and
$n_i$ = minimum number of subblocks capable of storing the data words of block i.

31. The method in accordance with claim 29 wherein for values of m from 2 to 8, inclusively, the step of skipping over memory location addresses for a straight addressing sequence of said memory section between successive blocks of data words is conducted in accordance with the following table:

| m | x | | | | | | | |
|---|---|---|---|---|---|---|---|---|
|   | 0 | 1 | 2 | 3 | 4 | 5 | 6 | 7 |
| 2 | 1 | 0 | | | | | | |
| 3 | 1 | 0 | 0 | | | | | |
| 4 | 1 | 0 | 0 | 1 | | | | |
| 5 | 1 | 0 | 0 | 1 | 2 | | | |
| 6 | 1 | 0 | 0 | 1 | 2 | 3 | | |
| 7 | 1 | 0 | 0 | 1 | 2 | 3 | 4 | |
| 8 | 1 | 0 | 0 | 1 | 2 | 3 | 4 | 5 | where the numerical contents of the table are representative of the number of memory location addresses of a sequence which are skipped between successive blocks of data words; and wherein for values of m greater than 8, the step of skipping over memory location addresses for a straight addressing sequence of said memory section between successive blocks of data words is conducted in accordance with the following expression:

No. of skipped memory location
addresses $= (m-1) - B$.

where B is the modulo m value of the number of data words in a block.

32. The method in accordance with claim 29 wherein the sequencing traversely of the memory locations of the subblocks in one of either a straight (S) or reverse (R) sequential order is conducted in accordance with the following table for values of m from 2 through 8, inclusively:

| m | x | | | | | | | |
|---|---|---|---|---|---|---|---|---|
|   | 0 | 1 | 2 | 3 | 4 | 5 | 6 | 7 |
| 2 | S | S | | | | | | |
| 3 | S | S | R | | | | | |
| 4 | S | S | R | R | | | | |
| 5 | S | S | R | R | R | | | |
| 6 | S | S | R | R | R | R | | |
| 7 | S | S | R | R | R | R | R | |
| 8 | S | S | R | R | R | R | R | R |

33. The method in accordance with claim 32 wherein for a corner turn sequence in which the addresses of the memory locations of the subblocks are sequentially traversed in a straight order, the step of skipping over memory location addresses between successive blocks of data words is conducted in accordance with the following expression:

No. of addresses of sequence skipped = the modulo m
value of $(m + 1 - Q)$.

where Q is the modulo m value of the number of data words in a block of the plurality.

34. The method in accordance with claim 32 wherein for a corner turn sequence in which the addresses of the memory locations of the subblocks are sequentially traversed in a reverse order, the step of skipping over memory location addresses between successive blocks of data words is conducted in accordance with the following expression:

No. of addresses of sequence skipped = the modulo $m$ value of $(m-1-Q)$, where Q is the modulo m value of the number of data words in a block of the plurality.

* * * * *